(12) United States Patent
Forrest et al.

(10) Patent No.: US 6,261,202 B1
(45) Date of Patent: *Jul. 17, 2001

(54) CONE CLUTCH STRUCTURE HAVING RECESSED AREAS FOR USE IN A LIMITED SLIP DIFFERENTIAL

(75) Inventors: James L. Forrest, Ashley; Robert Leeper, Fort Wayne, both of IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,156

(22) Filed: Aug. 12, 1999

Related U.S. Application Data

(63) Continuation-in-part of application No. 09/092,830, filed on Jun. 5, 1998, now Pat. No. 6,076,644.

(51) Int. Cl.[7] .............................. F16H 48/22; F16D 13/24
(52) U.S. Cl. .......................................... 475/235; 192/66.2
(58) Field of Search ................................... 475/235, 234, 475/240, 241, 231; 192/66.2, 113.36

(56) References Cited

U.S. PATENT DOCUMENTS

| | | | |
|---|---|---|---|
| 1,988,967 | 1/1935 | Emrick | 192/21 |
| 2,162,250 | * 6/1939 | Emrick | 192/66.2 |
| 3,327,563 | 6/1967 | Engle | 475/235 |
| 3,762,241 | 10/1973 | Roper | 475/240 |
| 3,815,443 | 6/1974 | McAninch et al. | 475/235 |
| 3,964,346 | 6/1976 | Myers, Sr. | 475/234 |
| 4,169,394 | 10/1979 | Estrada | 475/234 |
| 4,269,086 | 5/1981 | Altmann | 475/231 |
| 4,612,825 | 9/1986 | Engle | 475/235 |
| 4,815,337 | 3/1989 | Peloquin | 475/160 |
| 5,226,861 | 7/1993 | Engle | 475/234 |
| 5,366,421 | 11/1994 | Hirota | 475/231 |
| 5,556,344 | 9/1996 | Fox | 475/235 |
| 5,858,511 | 1/1999 | Lisowsky | 428/167 |

FOREIGN PATENT DOCUMENTS

| | | |
|---|---|---|
| 0 379 721 | 8/1990 | (EP) . |
| 1 216 899 | 12/1970 | (GB) . |
| 2 188 382 | 9/1987 | (GB) . |
| 02286944 | 11/1990 | (JP) . |

OTHER PUBLICATIONS

Partial European Search Report dated Jun. 2, 1999 for Application EP 99 10 3144.

* cited by examiner

*Primary Examiner*—Charles A Marmor
*Assistant Examiner*—Ankur Parekh
(74) *Attorney, Agent, or Firm*—Baker & Daniels

(57) ABSTRACT

A limited slip differential having at least one cone clutch element for frictionally engaging an interior surface of the rotatable differential casing. The cone clutch element has a plurality of clutch engagement surfaces which are disposed about the outside surface of the cone clutch element. Recessed areas are interposed between the clutch engagement surfaces. The total clutch engagement surface area is reduced to between 5% and 15% of the total engagement and recessed surface area of the clutch element to improve the performance of the differential at lower temperatures.

19 Claims, 22 Drawing Sheets

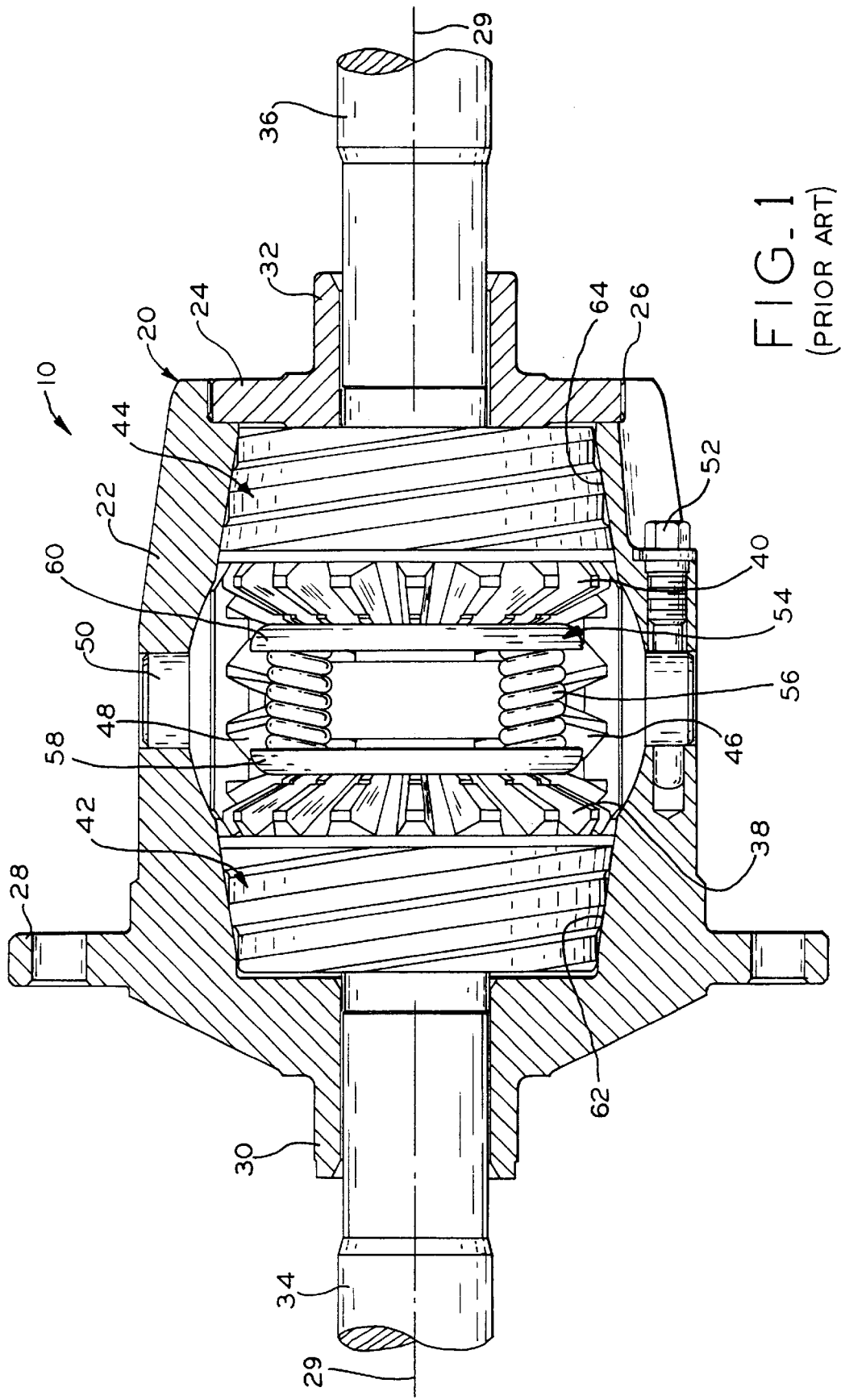
FIG_1
(PRIOR ART)

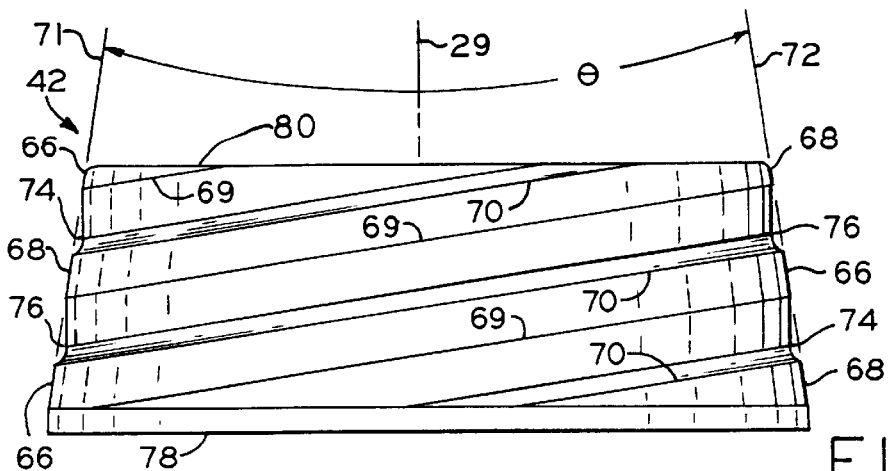
FIG_2 (PRIOR ART)
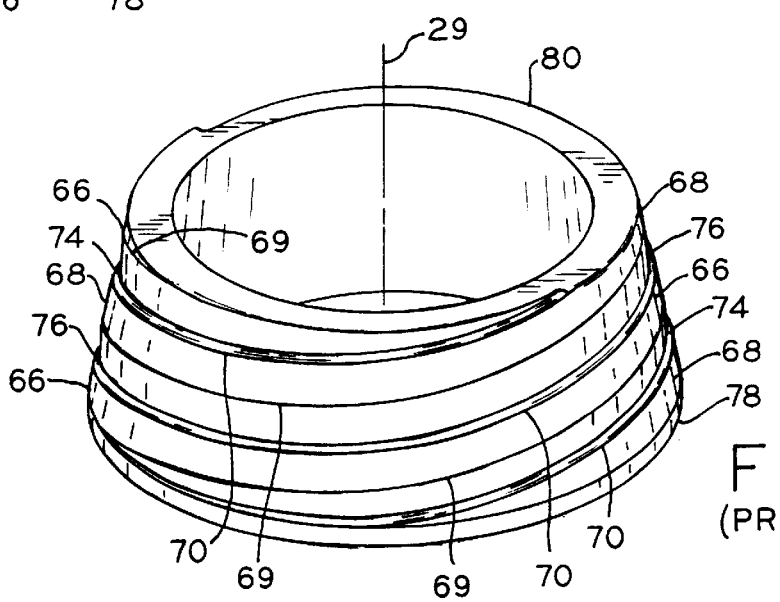
FIG_3 (PRIOR ART)
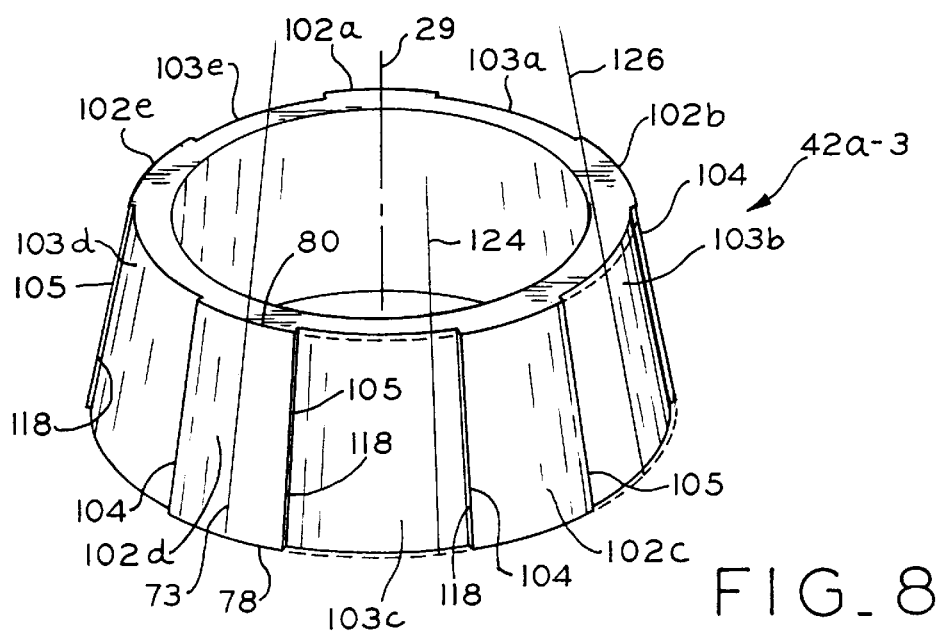
FIG_8C

FIG_9

FIG_11

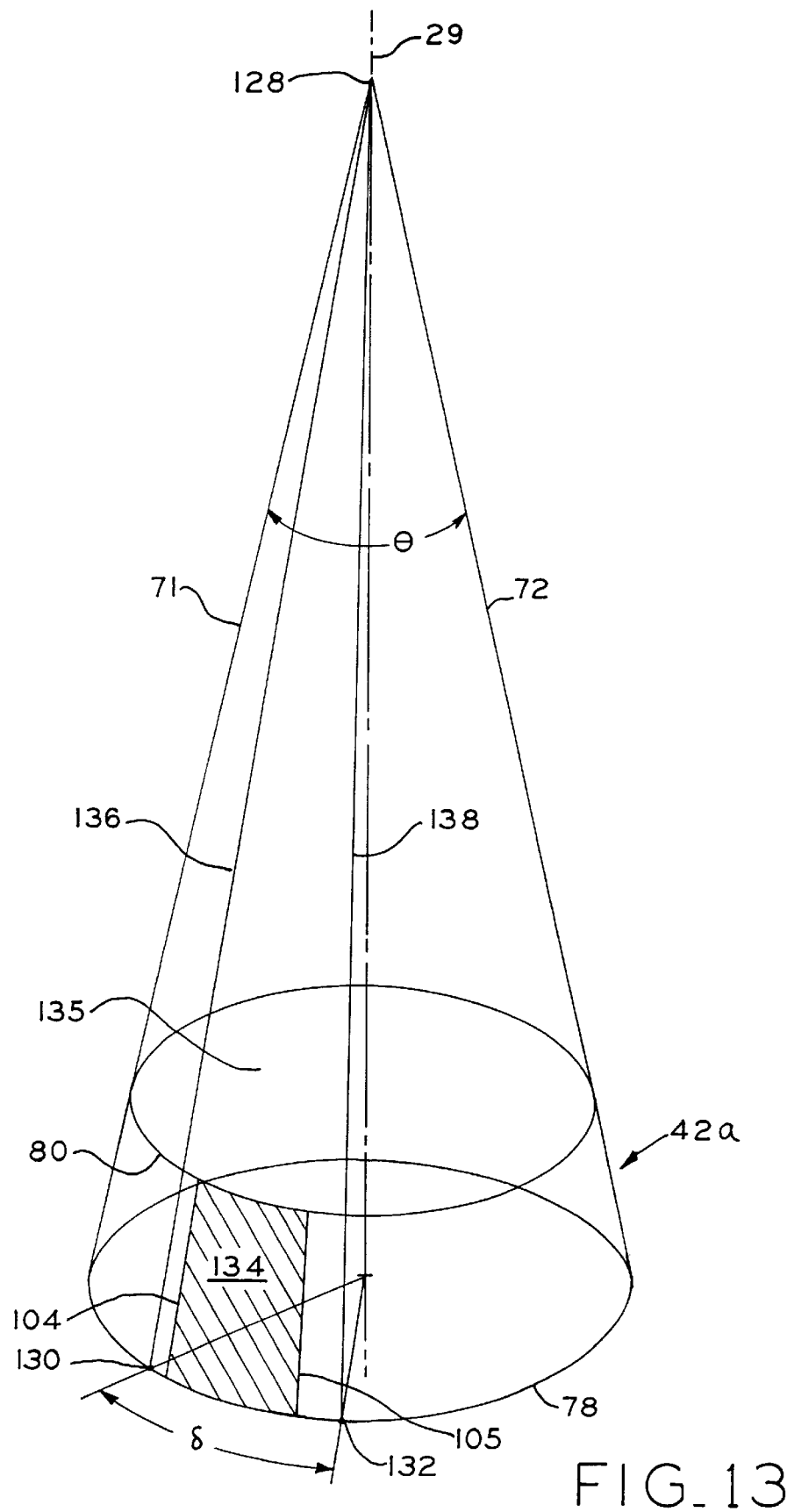
FIG_13

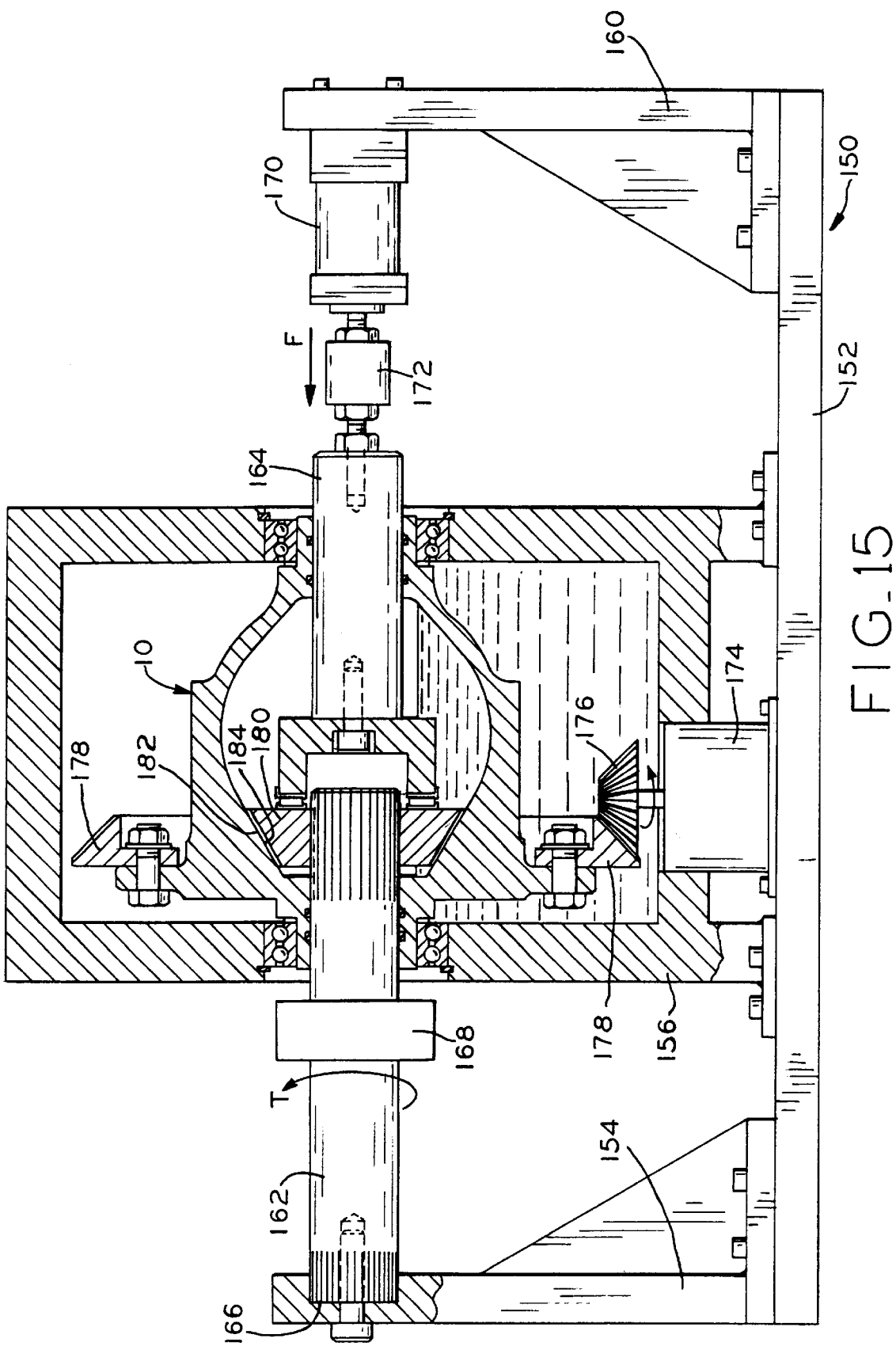
FIG_15

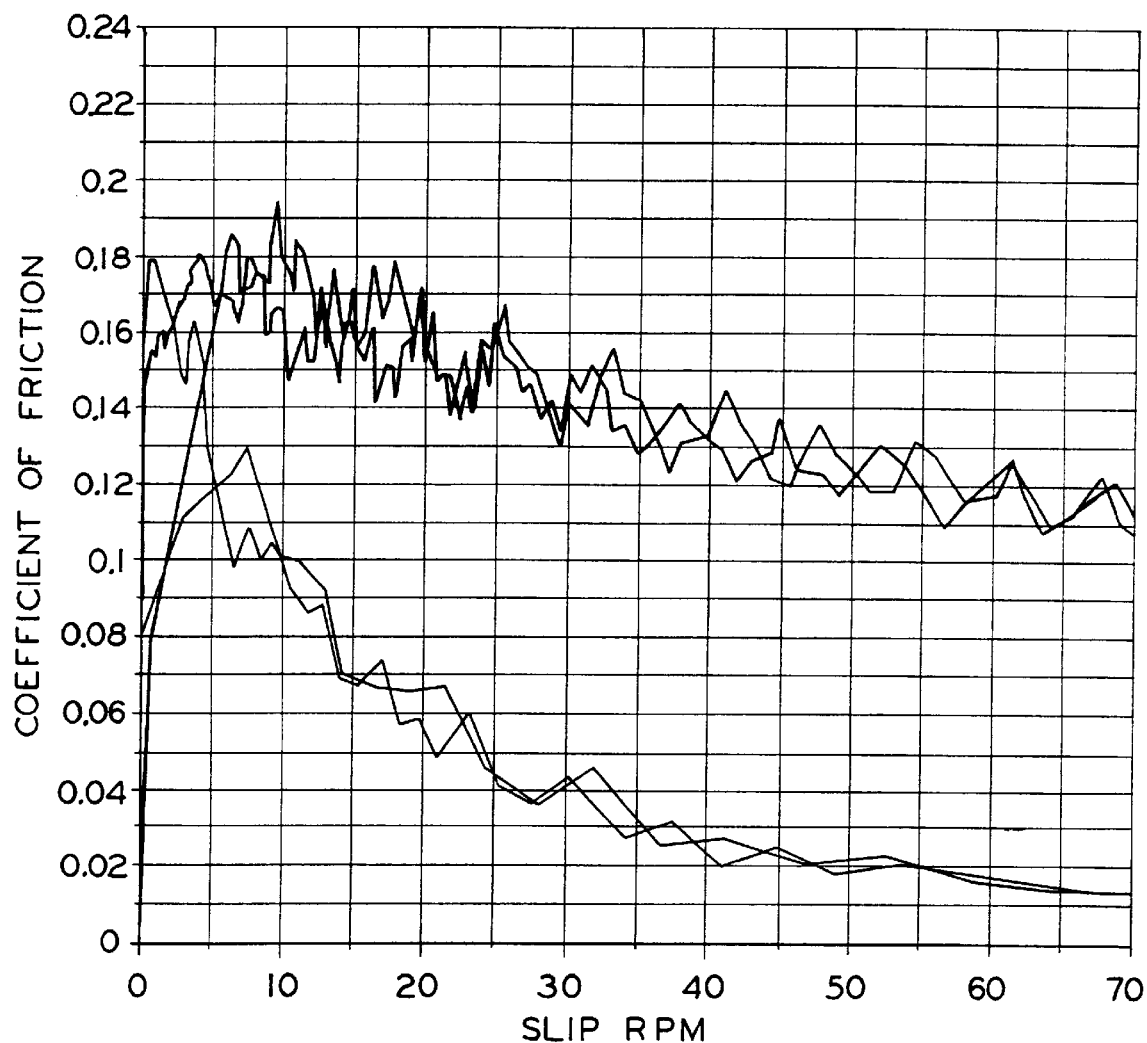
FIG_16A

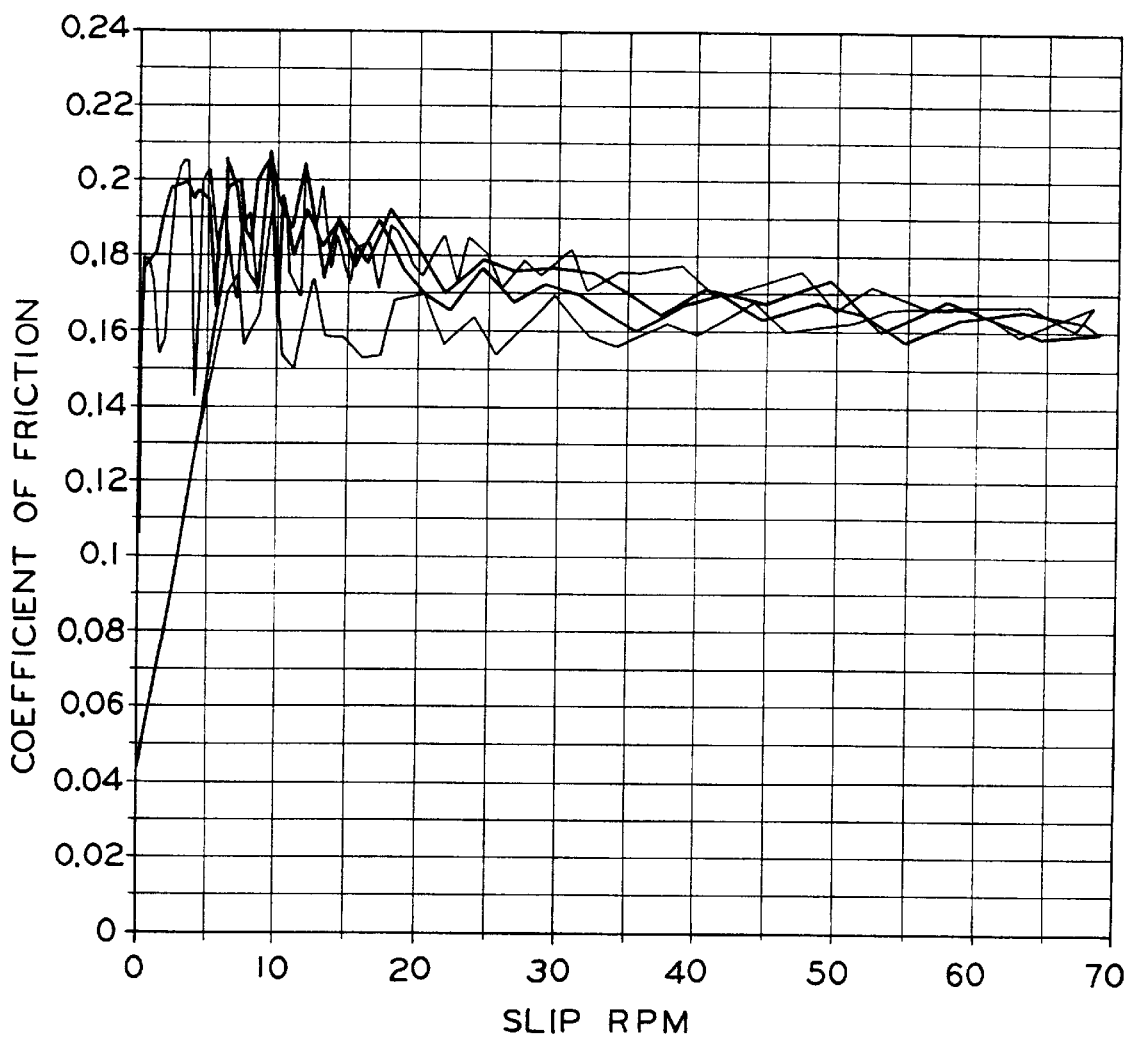
FIG_18B

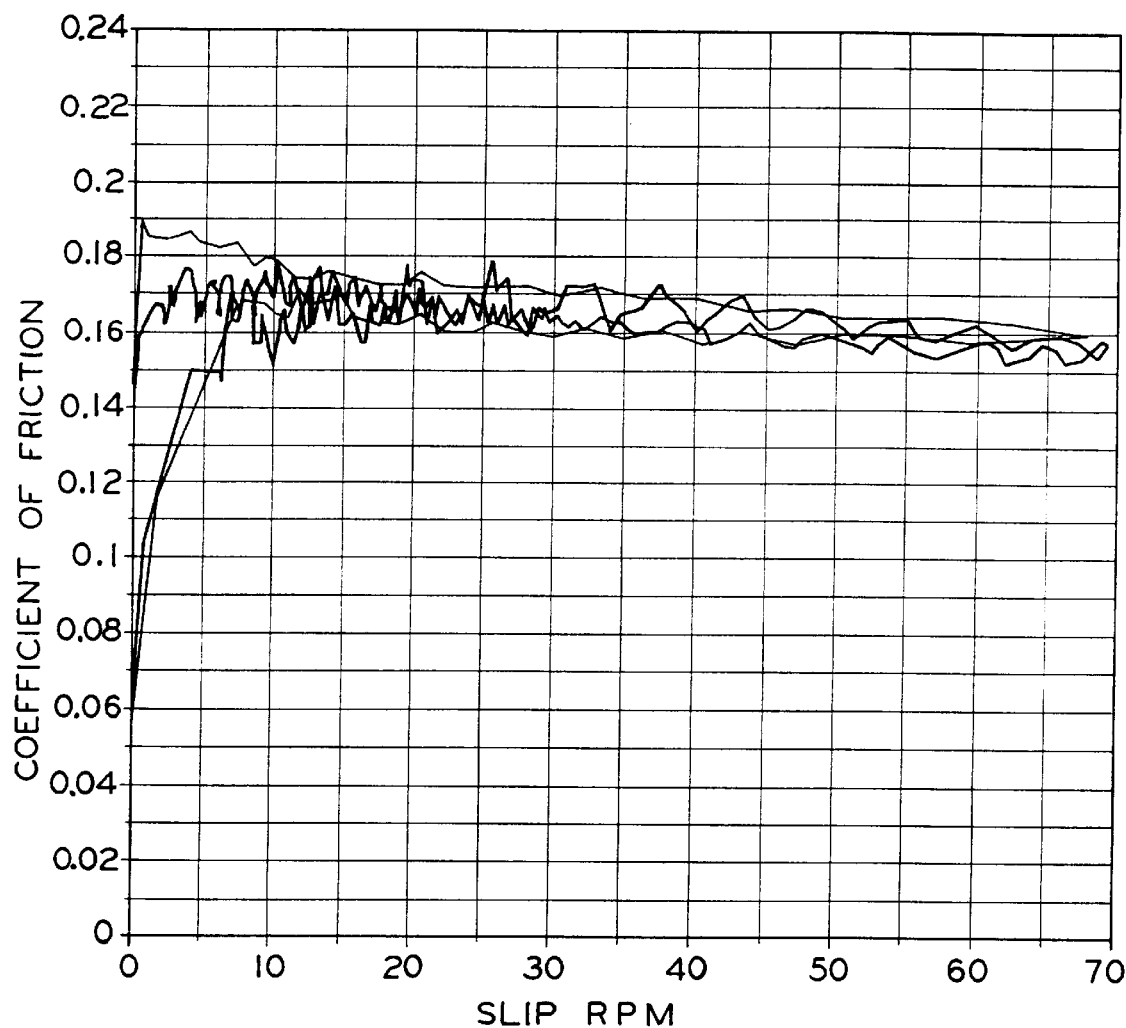
FIG_19A

CONE CLUTCH STRUCTURE HAVING RECESSED AREAS FOR USE IN A LIMITED SLIP DIFFERENTIAL

This is a Continuation-In-Part of U.S. patent application Ser. No. 09/092,830, filed Jun. 05, 1998, now U.S. Pat. No. 6,076,644, is issued Jun. 20, 2000.

BACKGROUND OF THE INVENTION

1. Field of the Invention

The present invention relates to differentials, and more particularly, to traction enhancing differentials having cone clutch elements.

2. Description of the Related Art

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e., a differential without clutches or springs, is unsuitable in slippery conditions where one wheel experiences a much lower coefficient of friction than the other wheel, for instance, when one wheel of a vehicle is located on a patch of ice and the other wheel is on dry pavement. In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing include use of a frictional clutch mechanism having a frusto-conical engagement structure and a bias mechanism, usually spring loaded, to apply an initial preload between the side gears and the differential casing. By using a frictional clutch with an initial preload a minimum amount of torque can always be applied to the wheel having traction, i.e. the wheel located on dry pavement. The initial torque generates gear separating forces which further engage the frictional clutch and develop additional torque.

The initial preload initiates the development of side gear separating forces which provide further braking action between the side gears and the differential casing. In general, gear separating forces are forces induced, due to the angle of contact or "pressure angle", on any set of meshing gears by the application of torque to the gears and which tend to separate the gears. In a differential, the development of torque will create side gear separating forces which tend to move the side gears away from the pinion gears. When one wheel is on a surface having a low coefficient of friction, the initial preload creates some contact and frictional engagement between the differential casing and the clutch mechanism disposed between the side gears and the differential casing to allow the engine to provide torque to the wheel having traction. This initial torque transfer induces gear separating forces on the side gears which tend to separate the side gears to further frictionally engage the clutch mechanism with the casing. The increased frictional engagement of the clutch allows more torque to be developed between the casing and the clutch element, thus further increasing the side gear separating forces and limiting the slippage between the side gears and the differential casing.

It is well known in the art to use frusto-conical clutch elements providing, on the outside surfaces thereof, a spiral structure which winds helically about the clutch element from its base to its tip, the tip comprising the annular edge resulting when the right circular cone is truncated at a plane parallel to its base, producing a frustum. The spiral structure provides a clutch engagement surface which frictionally engages an adjacent frusto-conical clutch interior surface of the differential casing. Generally, such cones are provided with a double helical structure, each helix beginning and ending at radially opposite points of the outside surface of the clutch element. These frusto-conical clutch elements are made of generally ferrous material and are produced using powdered metal or machined casting methods.

FIG. 1 illustrates one embodiment of prior art limited slip differential 10 having helical cone clutch elements. Differential 10 comprises casing 20, which includes casing parts 22 and 24 which are assembled via threaded joint 26. Casing part 22 includes radial flange 28, to which a ring gear (not shown) is attached by, for example, threaded fasteners (not shown). Torque output from a vehicle transmission applied to the ring gear causes differential casing 20 to rotate about axis 29. Casing parts 22 and 24 are provided with hollowed hub portions 30 and 32, respectively, through which extend output shafts or axles 34 and 36 along longitudinal axis 29. Fixed for rotation with the end of each axle 34 and 36 in the interior of casing 20 are bevel side gears 38 and 40, respectively. In the embodiment shown in FIG. 1, each side gear 38 and 40 is fixed for rotation with cone clutch element 42 and 44, respectively, having the above mentioned double helical structure about their outside surfaces. Cone clutch elements 42 and 44 are usually identical and do not necessarily provide helical structures which spiral outwardly from the center of case 20 along axis 29 as mirror images of one another. Notably, other embodiments of limited slip differentials may provide only one cone clutch member.

Intermeshed with the teeth of side gears 38, 40 are pinion gears 46, 48. The pinion gears rotate about cross shaft 50 which extends therethrough and is attached to casing 20 to rotate therewith. Thus pinion gears 46, 48 rotate about cross shaft 50 and revolve about axis 29 with casing 20. Cross shaft 50 is usually retained to casing 20 with a fastener such as bolt 52. Disposed between the facing surfaces of bevel side gears 38, 40 is some form of preload mechanism 54. In the shown embodiment preload mechanism 54 comprises a plurality of compression springs 56 and bearing plates 58, 60. Bearing plates 58 and 60 bear on the facing surfaces of bevel side gears 38 and 40, respectively, urging them apart under the influence of springs 56. This separating force is imparted through the side gears to the cone clutch elements 42, 44, urging their outside frusto-conical surfaces into relatively light frictional engagement with mating frusto-conical clutch seat surfaces 62, 64 of the interior of casing part 22. When the wheels (not shown) attached to axles 34, 36 have equal traction, input torque to casing flange 28 is distributed approximately equally therebetween, transmitted from casing 20 to cross pin 50, to pinion gears 46, 48, to side gears 38, 40 and then to axles 34, 36, which generally rotate at the same speed as casing 20. Under this condition, little appreciable torque is transmitted directly from casing 20 to side gears 38, 40 and axles 34, 36 through cone clutch elements 42, 44 because the frictional engagement between clutch seat surfaces 62, 64 and cone clutch elements 42, 44 is generally rather light and minor clutch slippage is allowed when turning. However, as one of the wheels attached to axles 34, 36 loses traction, the two axles and the cone clutch elements fixed to rotate therewith begin to rotate at different speeds relative to each other and to rotating casing 20. Under this condition, separation forces acting between pinion gears 46, 48 and side gears 38, 40, plus the spring preload forces, in conjunction with the sliding relative motion between clutch elements 42, 44 and seat surfaces 62, 64, cause frictional torque transfer between cone clutch elements 42, 44 and casing surfaces 62, 64, braking the axle rotating faster than casing 20 and transferring torque from casing 20 to the slower moving axle.

FIG. 2 shows a typical embodiment of prior art frusto-conical clutch element 42 (assumed identical to element 44) having, on its outside surface, helical structures providing two rather narrow, spiraling clutch engagement surfaces 66, 68 which coincide with a conic surface defined by imaginary element lines (two of which are represented by reference numerals 71 and 72) extending from base 78 of a right circular cone to its vertex 128 (FIG. 13). Each clutch engagement surface 66, 68 is bounded by a pair of spiraling, parallel lateral edges 69, 70. The prior art double helix cone clutch element of FIGS. 2 and 3 has spiraling clutch engagement surfaces 66, 68 begin at approximately radially opposite sides of base 78 and end at approximately radially opposite sides of tip 80. Each surface 66, 68 spirals approximately 360° circumferentially about the frusto-conical shape of element 42, with the full width of each surface 66, 68, i.e., the perpendicular distance between parallel lateral edges 69, 70, exposed over a circumferentially spiraling angle greater than 180° but less than 360°.

Lines 71 and 72, located on radially opposite sides of element 42, are typically separated by included angle θ ranging from about 10° to about 25°, depending on performance characteristics, with the smaller angle providing more aggressive clutch performance and the larger angle providing less aggressive clutch performance. It has been found that if the cone clutch angle is too small, there may be difficulty in releasing the clutch due to the wedging effect between the interengaging clutch surfaces and, if the cone clutch angle is too large, excessive preload pressure will be required to prevent slippage. Both surfaces 66, 68 of element 42 frictionally engage, in operation, mating clutch seat surface 62 in the interior of rotating casing part 22 (FIG. 1). Further, the helical structure of the outside surface of the shown clutch element provides two spiraling grooves or reliefs 74, 76 for channeling oil to and from the interfacing clutch surfaces. Examples of limited slip differentials employing such helically surfaced cone clutch elements are disclosed in U.S. Pat. Nos. 4,612,825 (Engle), 5,226,861 (Engle), 5,556,344 (Fox), and U.S. patent application Ser. No. 09/030,602 (Forrest et al), filed Feb. 25, 1998, which are assigned to the assignee of the present invention and expressly incorporated herein by reference.

A limited slip differential's ability to transfer the torque which is applied to the rotatable casing to the axle shafts is characterized by its bias ratio (BR), which is defined as the ratio of the torque applied to the higher torque axle ($T_{high}$), i.e., the relatively slower spinning or nonrotating axle, divided by the torque applied to the lower torque axle ($T_{low}$), i.e., the faster spinning axle. The total torque ($T_{tot}$) transferrable from the rotating differential case to the axles equals the sum of the torque applied, equally or unequally, to each of the two axles. Thus, the bias ratio can be expressed as follows:

$$BR = T_{high}/T_{low} = (T_{tot} - T_{low})/T_{low} \qquad \text{(Equation 1)}$$

A higher bias ratio means that the two axles attached to the differential act more like a solid axle in that the differential is better able to transfer torque applied to the rotating casing unequally to each axle, for in a limited slip differential, the torque applied to the rotating casing tends to be transferred to each axle depending on the traction available at that axle's wheel. In contrast, an open differential, i.e., a differential having no limited slip feature, which has a theoretical bias ratio of 1:1, transfers the torque applied to the rotating casing to each axle equally, regardless of the traction available at each wheel.

With reference now to FIG. 4, a linear graph which utilizes typical values of torque along its left hand vertical and horizontal scales, straight line 82 represents the theoretical relationship between the torque applied to the loose wheel or lower torque (faster spinning) axle ($T_{low}$) on the horizontal scale and $T_{tot}$, for an open differential with the opposite axle fixed so as not to rotate, the "wheel" of the nonrotating axle thus having maximum traction. The theoretical bias ratio for an open differential being 1:1, each point on line 82 has a value of $T_{tot}$, which is twice that of $T_{low}$.

Straight line 84 represents the theoretical relationship between $T_{low}$ and $T_{tot}$ under the assumption that $T_{high}$ is held at a maximum value of 12,500 inch pounds, i.e., one half the 25,000 inch pounds total torque applied to casing 20. At each point on line 84, $T_{tot}$ equals $T_{low}$ plus 12,500 inch pounds ($T_{high}$). Line 84 thus represents a solid axle condition. A limited slip differential cannot transfer less torque than an open differential nor more torque than a solid axle. Therefore, between lines 82 and 84 is the total operating envelope for differentials, comprising a range of $T_{low}$ and $T_{tot}$ relationships for limited slip differentials which may be plotted linearly along lines stemming from the intersection of the ordinate and the abscissa, each such linear line representing a different bias ratio. For example, bias line 86 represents a bias ratio of 1.67:1 and bias line 88 represents a bias ratio of 2.5:1. It can be seen, therefore, that the slope of the bias line is determined by clutch effectiveness.

The operation of a theoretical limited slip differential will now be further explained with reference to FIG. 4: Bias line 86, representing a BR of 1.67:1, extends from point 0,0, at the intersection of the ordinate and the abscissa, to point A, where it intersects line 84. (It should be noted that if a clutch biasing mechanism such as preload mechanism 54 (FIG. 1) were provided in the example differential, straight line 86 would intersect the ordinate at a value higher than zero.) Along line 86, to the left of point A, the differential controls the distribution of torque $T_{tot}$ from the rotating casing to the non-rotating, "tight" wheel axle and the spinning, "loose" wheel axle. The amount of torque $T_{high}$ which may be applied to the tight wheel axle is limited to the maximum traction available to that axle's wheel which, in this example, is 12,500 pound inches. The loose wheel traction is, during testing, variably controlled by means of a brake to set the amount of loose wheel torque $T_{low}$.

At all points along line 86, the tight wheel axle has more traction available to it than is utilized, and the differential governs how much of the total torque $T_{tot}$ is transferred from the casing to the axles; in other words, the differential is still differentiating. For example, although the tight wheel has 12,500 pound inches of traction available to it, equation 1 can be used to reveal that at the point on line 86 where $T_{tot}$ is 10,000 pound inches and $T_{low}$ is 3750 pound inches, $T_{high}$ is only 6250 pound inches. At point A, where $T_{tot}$ is 20,000 pound inches and $T_{low}$ is 7500 pound inches, $T_{high}$ reaches the maximum traction level of the tight wheel of 12,500 pound inches.

As $T_{low}$ increases above 7500 pound inches, and $T_{high}$ exceeds the maximum traction level available to the tight wheel, the differential no longer controls the total amount of torque $T_{tot}$ transferred from the rotating casing to the axles, and bias curve 86 no longer applies; in other words, the differential stops differentiating. At values of $T_{low}$ beyond 7500 pound inches, both the tight and loose wheels spin, and relationship between $T_{tot}$ and $T_{low}$ follows curve 84 from point A onwards, simulating a solid axle in that each unit increment of $T_{low}$ is correspondingly added to $T_{tot}$. Thus, at points on line 84 to the right of point A, the amount of total torque $T_{tot}$ transferred from the casing to the axles depends solely on the amount of traction available to the loose wheel.

Because preloaded clutches are usually always engaged, they are susceptible to wear. And although frusto-conical, helical clutch elements as described above are initially effective in providing adequate clutched engagement, over repeated use that effectiveness degrades significantly, reducing the amount of torque which can be transferred between cone clutch element 42 and differential casing 20.

Referring again to FIG. 4, line 90 represents measured values of $T_{tot}$ for given $T_{low}$ values for limited slip differential 10 as shown in FIG. 1, having two double helical cone clutches as described above. The total area of clutch engagement surfaces 66, 68 is about 5.2 square inches per clutch element and the included angle θ between element lines 71, 72 is 25°. The data generating line 90 taken from a particular differential unit prior to durability testing. This same differential unit, after having undergone 400 miles of simulated highway driving with a normal sized tire and wheel attached to one axle and a mini-spare tire attached to the other, a condition designed to induce clutch slippage and thus burnish the clutch surfaces, produced the measured values of $T_{tot}$ for given $T_{low}$ represented by line 92. As can be seen, the bias ratio of this differential unit degraded appreciably through use. The right hand side of FIG. 4 has been scaled vertically to compare directly, through lines 94 and 96, the relationship between bias ratio and $T_{low}$ before and after durability testing, respectively. A comparison of lines 94 and 96 illustrates a substantial degradation in clutch performance over the operating range of $T_{low}$ values after the clutch surfaces have worn. This resulting reduction in the bias ratio may lead to undesirable repair and replacement costs. A limited slip differential with improved bias ratio durability is thus desirable, particularly if this improvement can be accomplished without substantially increasing variable cost, package size or weight. Thus, it is desired to provide this advantage with a cone clutch element which is directly interchangeable with element 42.

SUMMARY OF THE INVENTION

The present invention provides an improved cone clutch element for use in a limited slip differential as described above. Rather than providing a frusto-conical outer surface having spiraling engagement surfaces and oil channeling grooves, the inventive clutch element provides a plurality of smooth clutch engagement surfaces defining a frusto-conical shape and having a recessed area interposed between adjacent engagement surfaces.

Various embodiments of the present invention provide a cone clutch element having three, four and five clutch engagement surface sections defining a frustoconical shape. Each of the recessed areas interposed between the clutch engagement surfaces generally conform to the area between a pair of element lines extending from the base of a right circular cone to its vertex, the cone being truncated at a plane parallel to its base to provide the frustum which generally defines the cone clutch element and which has a generally annular tip at its truncated end, opposite its base. The clutch engagement surfaces of a given embodiment of the inventive cone clutch element are generally equivalent in area and equally spaced about the outside periphery of the clutch element. The recessed areas extend between the tip and the base and provide channels for collecting oil which flows from between the interfacing clutch surfaces upon their engagement.

The cone clutch element of the present invention provides the advantage of increasing the durability of the bias ratio of a limited slip differential vis-a-vis prior cone clutch elements having a spiraling engagement surface and oil channeling groove. Furthermore, cone clutch elements according to the present invention may be directly substituted for prior, helical elements, and provide an improved differential for little or no increase in variable cost or weight.

The present invention provides a limited slip differential comprising a pair of axles rotatable about a first axis and a rotatable casing also rotatable about the first axis. At least one planet gear is rotatable about an axis perpendicular to the first axis, the planet gear revolving about the first axis. A pair of side gears is intermeshed with the planet gears, each side gear adapted to rotate with one of the axles. A clutch element is disposed between at least one axle and the casing, the clutch element adapted to rotate with the axle. The clutch element comprises a plurality of clutch engagement surfaces lying on a frusto-conical surface defined by a right circular cone having a vertex and a circular base. The total surface area of the clutch engagement surfaces is in a range of 5% to 15% of the total surface area of the frusto-conical surface. Each clutch engagement surface is bounded by at least one lateral edge and is completely contained within a surface of a right conic sector defined by two straight lines extending from the vertex to the circular base, the sector extending through an angle in the range of 0° to 180° about the base, the clutch element operable to frictionally engage at least one of the axles and the rotatable casing.

The present invention also provides a cone clutch element for a limited slip differential, the element comprising a plurality of clutch engagement surfaces lying on a frusto-conical surface defined by a right circular cone having a vertex and a circular base. The total surface area of the clutch engagement surfaces is in a range of 5% to 15% of the total surface area of the frusto-conical surface. Each of the clutch engagement surfaces is bounded by at least one lateral edge and is completely contained within a right conic surface sector defined by two lines extending from the vertex to the circular base, the sector extending less than 180° about the base.

The present invention also provides a limited slip differential comprising a pair of axles rotatable about a first axis and a rotatable casing also rotatable about the first axis. At least one planet gear is rotatable about an axis perpendicular to the first axis and revolves about the first axis. A pair of side gears is intermeshed with the planet gears, each of the side gears adapted to rotate with one of the axles. A clutch element is disposed between at least one axle and the casing, adapted to be rotated with the axle and operable to frictionally engage at least one of the axles and the rotatable casing. The clutch element further comprises surface means for frictionally engaging an interior surface of the rotatable casing. The total surface area of the surface means is in a range of 0.5 to 1.5 square inches.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a sectional side view of one embodiment of a prior art limited slip differential using cone clutch elements having two spiraling engagement surfaces and oil channeling grooves provided on the outside surface thereof;

FIG. 2 is a side view of a cone clutch element of the differential of FIG. 1;

FIG. 3 is a perspective view of the cone clutch element of FIG. 2;

FIG. 13 is a partial schematic of a cone clutch element according to the present invention;

FIG. 15 is a schematic diagram of a limited slip differential test fixture;

FIG. 16A is a graph illustrating the relationship between Slip RPM and Coefficient of Friction, at different lubricant temperatures, for a single cone clutch element as depicted in FIG. 8, as tested in a fixture according to FIG. 15, a constant, axially-directed load of 250 lb. applied to the cone clutch element;

FIG. 18B is a graph illustrating the relationship between Slip RPM and Coefficient of Friction, at different lubricant temperatures, for a single, further improved cone clutch element according to the present invention as depicted in FIG. 14, as tested in a fixture according to FIG. 15, a constant, axially-directed load of 1000 lb. applied to the cone clutch element;

FIG. 19A is a graph illustrating the relationship between Slip RPM and Coefficient of Friction, at different lubricant temperatures, for a single cone clutch element as depicted in FIG. 8, as tested in a fixture according to FIG. 15, a constant, axially-directed load of 1500 lb. applied to the cone clutch element.

Figure 4:
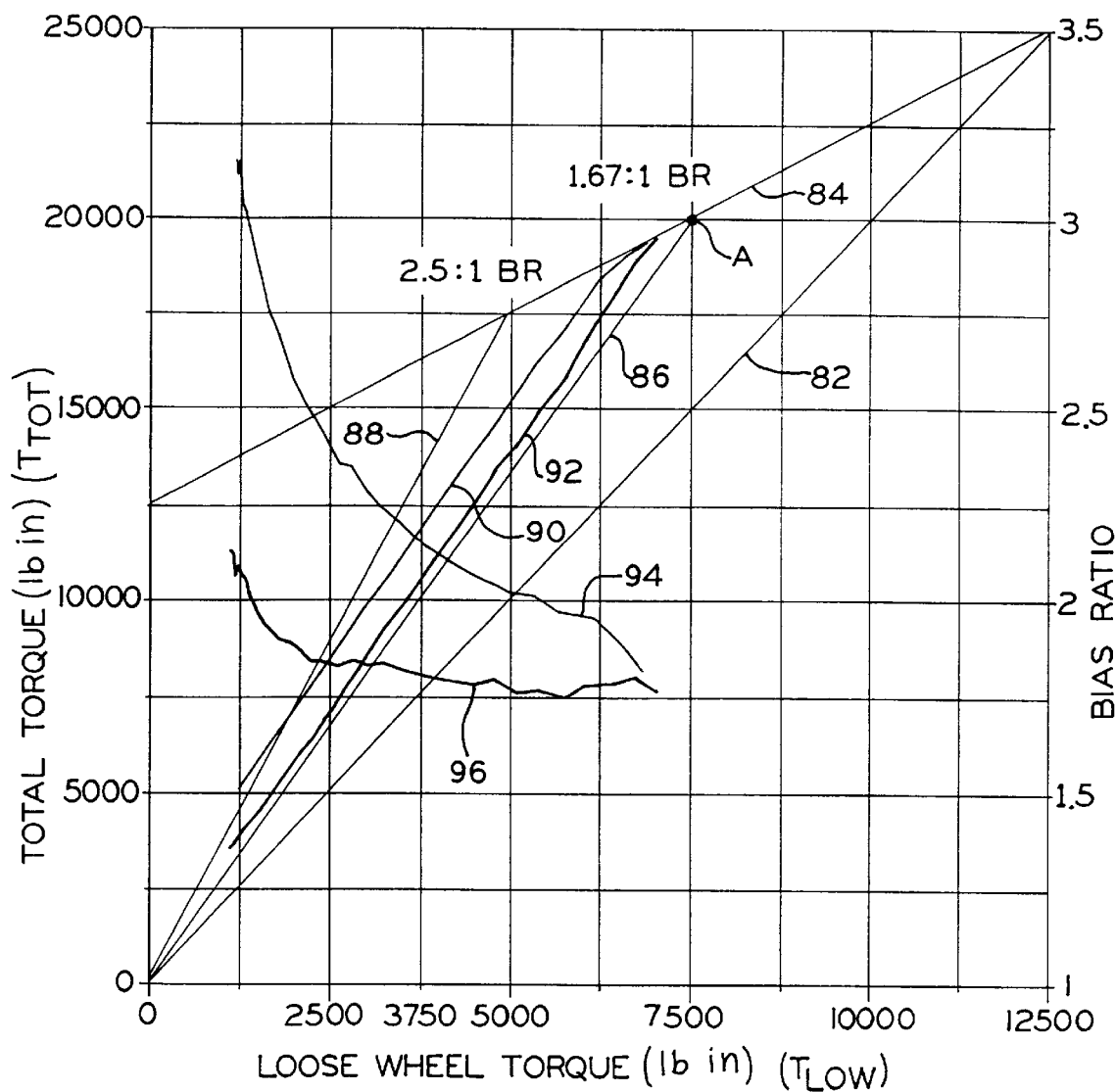
FIG. 4 is a graph illustrating the relationship between the total torque applied by the differential casing to the axles and the torque applied to the axle having the lower torque, and the relationship between the bias ratio and the torque applied to the axle having the lower torque, for the differential of FIG. 1, before and after durability testing.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in alternative forms, and such exemplifications are not to be construed as limiting the scope of the invention in any manner.

DETAILED DESCRIPTION OF THE INVENTION

The embodiments disclosed below are not intended to be exhaustive or limit the invention to the precise form disclosed in the following detailed description. Rather, the disclosed embodiments are chosen and described so that others skilled in the art may be able to make and use the present invention.

Figure 5:
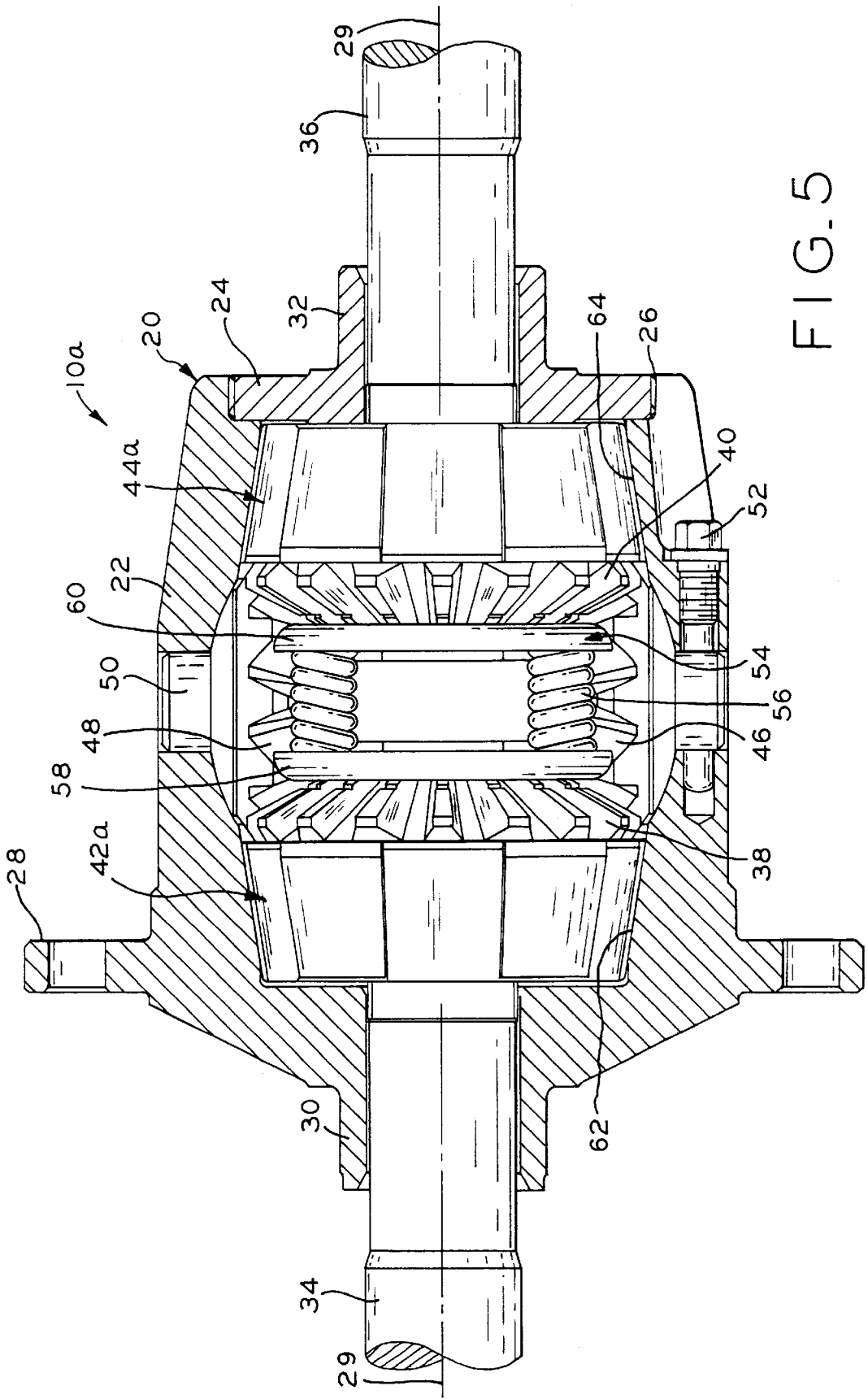
FIG. 5 is a sectional side view of one embodiment of a limited slip differential according to the present invention.

FIG. 5 shows one embodiment of limited slip differential 10*a* according to the present invention. Differential 10*a* comprises inventive cone clutch elements 42*a* and 44*a*, but is otherwise identical in design and construction to previously known differential 10 shown in FIG. 1. Although differential 10*a* is shown to include two cone clutch elements, it is to be understood that limited slip differential embodiments having only one cone clutch element according to the present invention are considered to be within the scope of the present invention. Moreover, although it is envisioned that where two cone clutch elements according to the present invention are used, those elements will normally be identical, that is not necessarily the case. However, for purposes of clarity, reference below to inventive cone clutch element 42*a* and any of its embodiments should be understood to refer to inventive cone clutch element 44*a* as well.

Figure 6:
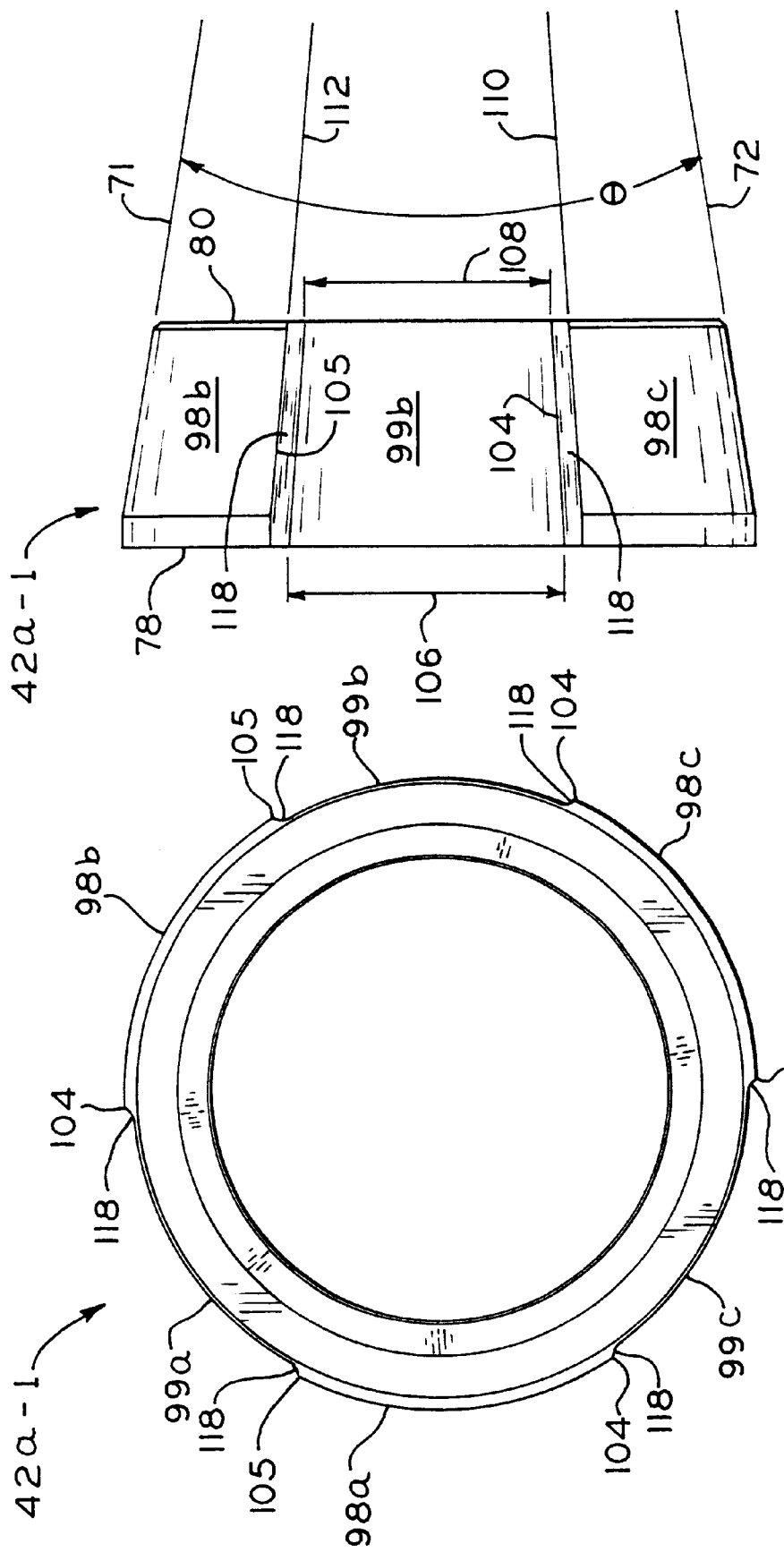
FIG. 6A is an end view of one embodiment of a cone clutch element according to the present invention.
FIG. 6B is a side view of the cone clutch element of FIG. 6A.

Referring to FIGS. 6A and 6B, a first embodiment of inventive cone clutch element 42*a* is shown, designated with reference numeral 42*a*-1. This embodiment comprises three clutch engagement surface segments 98*a*, 98*b*, 98*c* of approximately equal area and generally disposed equally about the outside surface of element 42*a*-1. Interposed between clutch engagement surface segments 98*a*–*c* are recessed areas 99*a*, 99*b*, 99*c*.

Figure 7:
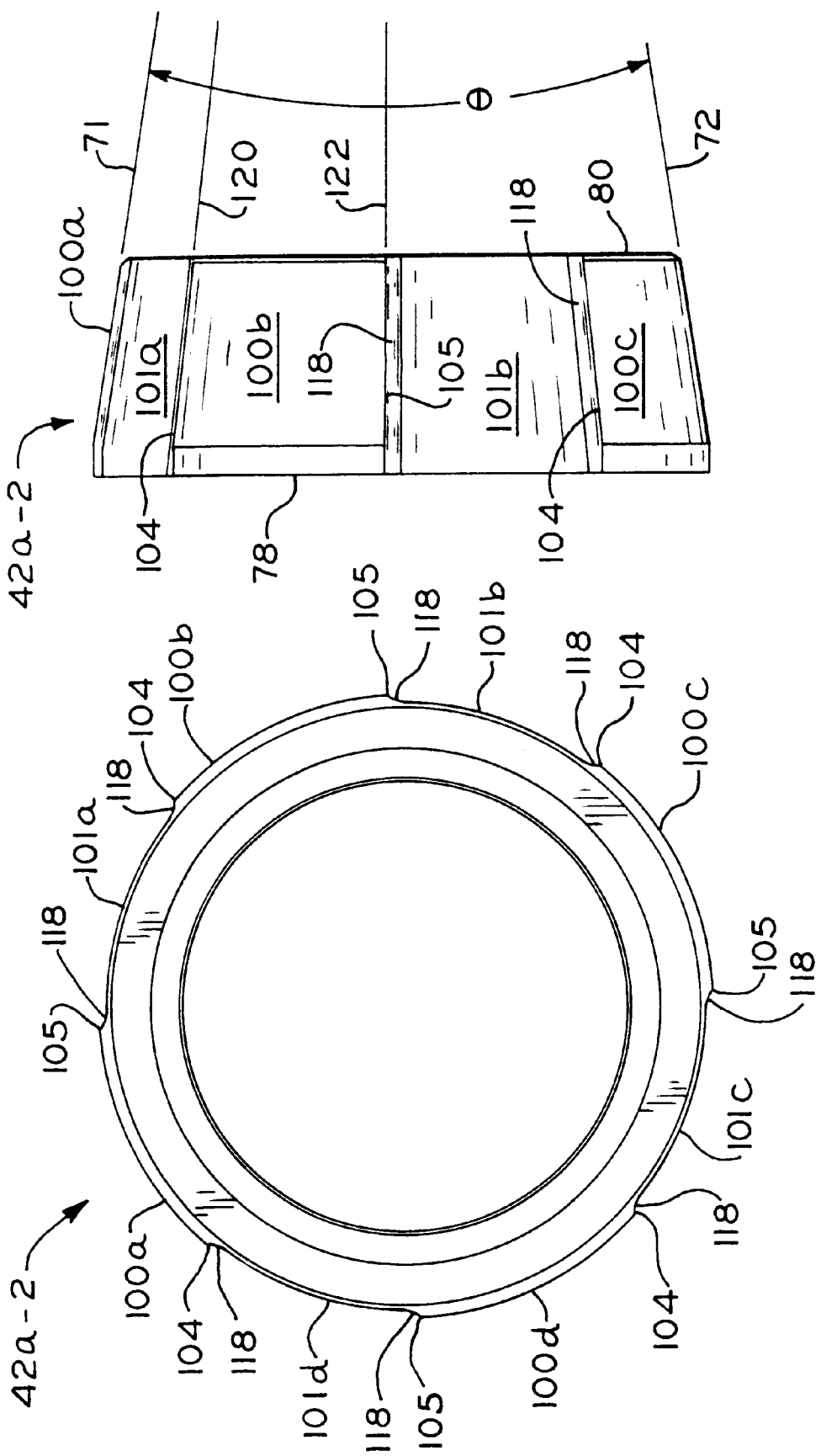
FIG. 7A is an end view of another embodiment of a cone clutch element according to the present invention.
FIG. 7B is a side view of the cone clutch element of FIG. 7A.

Referring to FIGS. 7A and 7B, a second embodiment of a cone clutch element according to the present invention is shown, designated with reference numeral 42*a*-2. This embodiment comprises four clutch engagement surface segments 100*a*, 100*b*, 100*c*, 100*d* of approximately equal area and generally disposed equally about the outside surface of element 42*a*-2. Interposed between clutch engagement surface segments 100*a*–*d* are recessed areas 101*a*, 101*b*, 101*c*, 101*d*.

Figure 8:
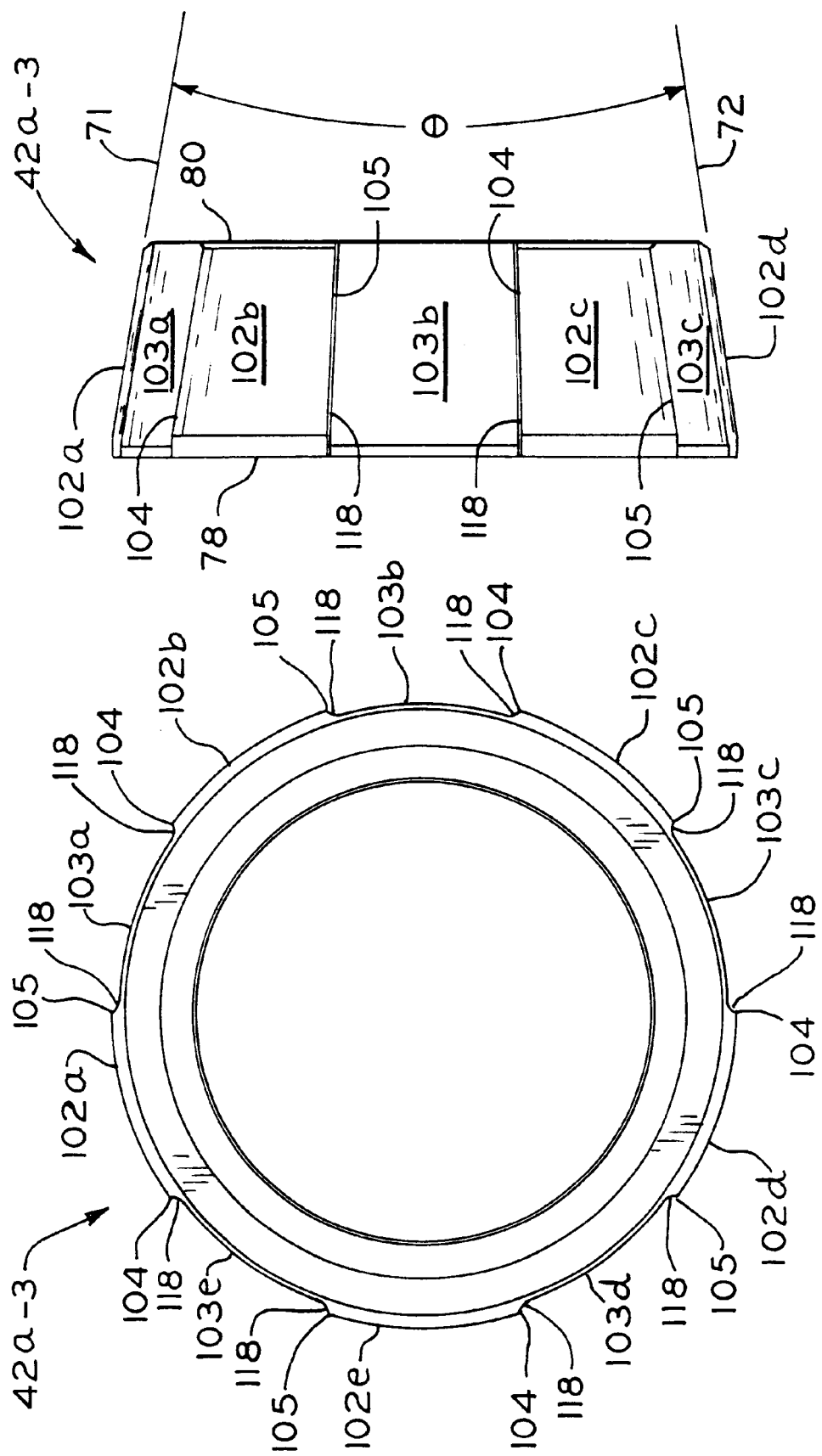
FIG. 8A is an end view of yet another embodiment of a cone clutch element according to the present invention.
FIG. 8B is a side view of the cone clutch element of FIG. 8A.
FIG. 8C is a perspective view of the cone clutch element of FIG. 8A.

Similarly, referring to FIGS. 8A and 8B, a third embodiment of a cone clutch element according to the present invention is shown, designated with reference numeral 42*a*-3. This embodiment comprises five clutch engagement surface segments 102*a*, 102*b*, 102*c*, 102*d*, 102*e* of approximately equal area and generally disposed equally about the outside surface of element 42*a*-3. Interposed between clutch engagement surface segments 102*a*–*e* are recessed areas 103*a*, 103*b*, 103*c*, 103*d*, 103*e*.

In each of these three embodiments of inventive cone clutch element 42*a*, the total engagement surface area approximates that of prior art cone clutch element 42, which includes the areas of spiral engagement surfaces 66 and 68 and totals about 5.2 square inches per clutch element. Also, the total recessed area of each embodiment of inventive cone clutch element 42*a* is generally equivalent to its total engagement surface area. Thus, the sum of areas of surfaces 98*a*–*c*, the sum of areas of surfaces 100*a*–*d*, and the sum of areas of surfaces 102*a*–*e* are equivalent to the sum of the areas of spiraling surfaces 66 and 68, as are the sum of recessed areas 99*a*–*c*, the sum of recessed areas 101*a*–*d* and the sum of recessed areas 103*a*–*e*. Further, it has been found that establishing the recessed area at a generally constant depth of approximately 0.040 inch below the frusto-conical surface defined by the clutch engagement surfaces performs well, although it is believed that deeper recessed area depths should work as well. Providing recessed areas at depths of less than 0.040 inch may perform satisfactorily, but may require use of a lubricant having less viscosity than typically used in such differentials.

In the shown embodiments of cone clutch elements 42 and 42*a*, the clutch engagement surfaces conform to the surface of a right circular cone having element lines which extend from its base to its vertex. Two of these element lines are represented by lines 71 and 72, which intersect radially opposite points on the circular cone base and are shown in FIGS. 2, 6A, 7A and 8A. Generally, angle θ between lines 71 and 72 ranges from 10° to 25°, and prior art cone clutch element 42 and inventive cone clutch element 42*a* must share a common angle θ to be compared or substituted. Similarly the heights of elements 42 and 42*a*, as defined as the axial distance between base 78 and tip 80, must be common for comparison or substitution purposes. Element 42*a* is adapted to mate with bevel side gears 38, 40 in the same way as does element 42 and thus element 42*a* may be interchangeably packaged in differential casing 20 as a substitute for element 42. Moreover, as is the case with previous cone clutch element 42, cone clutch element 42*a* is made of generally ferrous material and produced using powdered metal or machined casting methods. Therefore, differences in variable cost and weight between differentials 10 and 10*a* are expected to be negligible.

In each embodiment of cone clutch element 42*a*, the surface profile of each clutch engagement surface, viewed from the edge of base 78 towards vertex 128 (FIG. 13) of the cone along an element line such as 71 or 72, is substantially convex. Also, referring to FIGS. 6A–8B, it can be seen that each clutch engagement surface segment terminates, at its lateral sides, with nonchamfered edges 104, 105. As clutch element 42*a* rotates relative to casing 20, leading edge 104 or 105 is believed to push excessive lubricating oil from casing clutch seat surfaces 62, 64 during unclutched operation of differential 10*a* when cone clutch element 42*a* is in light frictional contact with surfaces 62, 64, the oil being displaced into the recessed areas of the cone clutch element. Oil is allowed to flow unobstructedly in and out of the recessed area of element 42*a* through their open ends at base 78 and tip 80. During engagement of the clutch, as cone clutch element 42*a* is brought into sliding contact with relatively rotating seat surfaces 62, 64, leading edge 104 or 105 is believed to squeegee substantially all of the oil from those surfaces, precluding hydrodynamic "floating" of the clutch surface segments on surfaces 62, 64 during intended clutch operation. It has been found that filleting transition surface 118, i.e., providing a concave joint between edges 104, 105 and the adjacent recessed area, is sufficient to achieve desired results and it is believed that providing any profile to transition surface 118 which preserves the non-chamfered characteristic of edges 104, 105, e.g., angled or squared, will be satisfactory.

Referring now to FIG. 6B in particular, it is shown that width 106 of recessed area 99*b* at base 78 is greater than its width 108 at tip 80. This is the result of element lines 110 and 112, which extend along edges 104 and 105, respectively, on opposite lateral sides of a given recessed area, converging as they progress from base 78 to cone vertex 128 (FIG. 13) Alternatively, it is contemplated that widths 106 and 108 may be equivalent, in which case element lines 110 and 112, which are coincident with edges 104, 105 on opposite lateral sides of a given recessed area, e.g., 99*b*, would be parallel rather than converging as shown. Referring now to FIG. 7B, a second alternative would provide that element lines 120 and 122, which extend along edges 104 and 105, respectively, on opposite lateral sides of a given clutch engagement surface segment, e.g., 100*b*, would be parallel rather than converging as shown. It is further contemplated that adjacent straight lateral edges 104, 105 may be neither parallel nor both converging to a common vertex point, and still further contemplated that lateral edges 104, 105 may instead be curved. In any case, element lines 71 and 72 would, of course, maintain their original orientation, the clutch engagement surface segments still defining the frusto-conical shape. By analogy, this aspect of the present invention is attributable to its other shown embodiments. Thus it is contemplated that the scope of the present invention encompasses unshown alternatives in which lateral edges 104, 105 bounding either a clutch engagement surface or recessed area may be parallel rather than converging to a vertex, straight but neither parallel nor converging to a vertex, or curved. In any case, however, each clutch surface segment of the inventive cone clutch element (such as, for example, surface 102d of element 42a-3 in FIG. 8C) generally extends from base 78 to tip 80. At least one linear element line similar to line 71 or 72 (e.g., line 73 in FIG. 8C), which extends from base 78 to the vertex of the right circular cone defining the shape of cone clutch element 42a, will traverse the entire length of each clutch surface segment between its lateral edges 104 and 105. It may be that line 73 intersects base 78 near edge 104 and tip 80 near edge 105, or conversely, yet each embodiment of the present invention is characterized by the clutch engagement surfaces extending, in a substantially direct way, from base 78 to tip 80 of the frusto-conical surface defining element 42a.

Further, the recessed areas adjacent lateral edges 104, 105 of a given clutch engagement surface segment of the inventive cone clutch element (such as, for example, areas 103b and 103c located on either side of clutch engagement surface 102c of element 42a-3 in FIG. 8C) generally extend from base 78 to tip 80. Linear element lines similar to line 71 or 72 (e.g., lines 124 and 126 in FIG. 8C), which extend from base 78 (shown in dashed lines across areas 103b, 103c) to the vertex of the right circular cone defining the shape of element 42a, will traverse the entire length of the respective recessed area (e.g., 103b, 103c) between its bordering lateral edges 104, 105, one of those edges partially defining the next adjacent clutch element surface segment (e.g., 102b or 102d in FIG. 8C). Therefore, it is seen that clutch engagement surface segment 102c is completely contained within the cone segment defined by lines 124, 126. It may be that line 124 or 126 intersects base 78 near edge 104 and tip 80 (shown in dashed lines across areas 103b, 103c) near edge 105, or conversely, yet each embodiment of the present invention is characterized by the recessed areas between adjacent clutch engagement surfaces extending, in a substantially direct way, from base 78 to tip 80 of the frusto-conical surface defining element 42a.

Referring now to FIG. 13, according to the present invention, any individual clutch engagement surface 134 may be completely contained within surface 135 of a right conic segment defined by two straight lines 136, 138 which extend from vertex 128 to circular cone base 78, intersecting the circumference of the base at points 130, 132. A characteristic common to all embodiments of element 42a is that lines 136, 138 traverse the recessed areas on opposite sides of any clutch engagement surface segment 134 without crossing surface 134. Moreover, any individual clutch engagement surface segment 134 according to the present invention may be completely contained between lines 136, 138, which intersect base 78 at points 130, 132, respectively, the radial angle δ between these points ranging from 0° to 180°.

Figure 9:
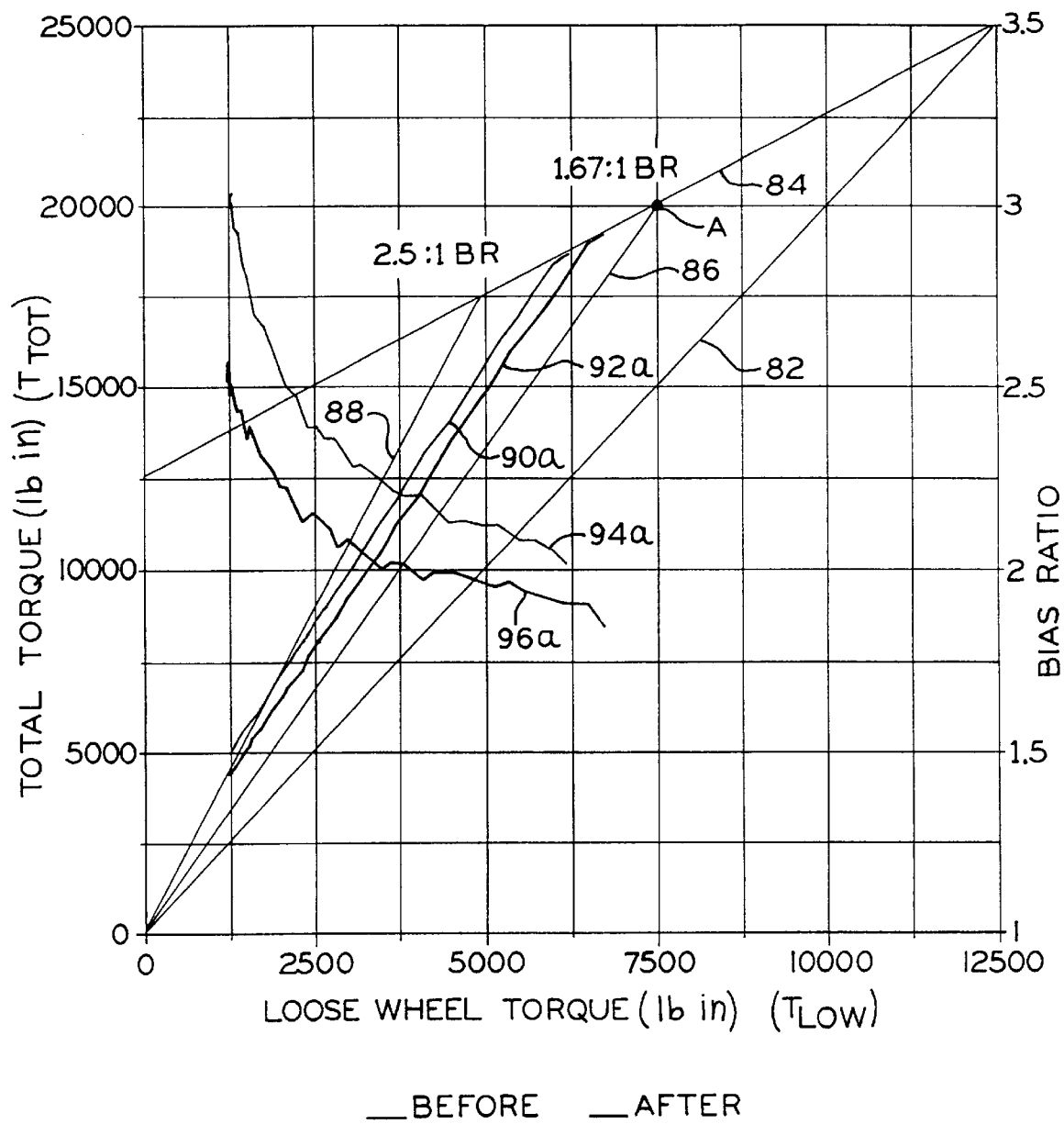
FIG. 9 is a graph illustrating the relationship between the total torque applied by the differential casing to the axles and the torque applied to the axle having the lower torque, and the relationship between the bias ratio and the torque applied to the axle having the lower torque, for the differential of FIG. 5 having two frusto-conical clutch elements as shown in FIGS. 8A–8C, before and after durability testing.

The graph shown as FIG. 9 is the counterpart of FIG. 4, illustrating measured $T_{tot}$ and bias ratio values for given $T_{low}$ values for differential 10a as shown in FIG. 5, having two cone clutch elements 42a-3, each of which, as shown in FIGS. 8A–8C, have five clutch surface segments of equivalent size and are equally disposed about the outside surface of the element. This differential unit is otherwise identical to the unit associated with the results graphed in FIG. 4. These two differential units were subjected to the same durability test procedure. Prior to undergoing durability testing, $T_{tot}$ and bias ratio were measured for given $T_{low}$ values, the measured values represented by lines 90a and 94a, respectively. As can be seen by comparing lines 90 and 94 (FIG. 4) with lines 90a and 94a (FIG. 9), pretest performance is comparable, though slightly better, with the inventive clutches vis-a-vis the helically shaped cone clutches. Post-durability test measurements, however, indicate a substantial performance improvement with the inventive clutches, as can be seen by comparing lines 92 and 96 (FIG. 4) with lines 92a and 96a (FIG. 9). Most clearly indicated is the improvement in bias ratio durability, which can be seen by comparing lines 94 and 96 in FIG. 4 and lines 94a and 96a in FIG. 9, particularly at lower values of $T_{low}$. It is notably, too, that the shape of post-test bias ratio curve 96a conforms to pretest bias ratio curve 94a in FIG. 9, whereas a comparison of the shapes of pretest bias ratio curve 94 and post-test curve 96 indicates clutches 42 experienced significant bias ratio degradation during testing.

Figure 10:
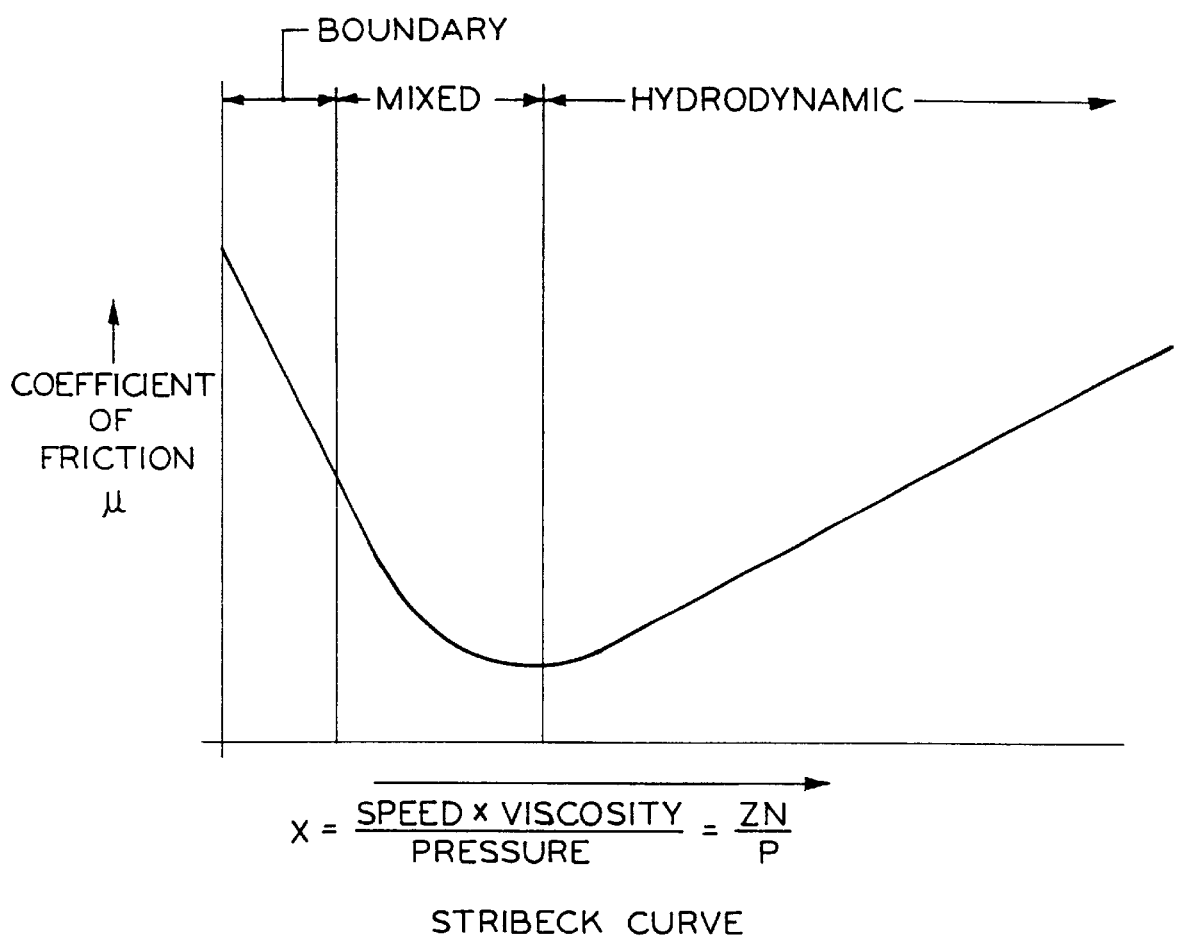
FIG. 10 is a Stribeck curve (Arthur Caines and Roger Haycock, *Automotive Lubricants Reference Book*, 31 (1996)) illustrating how the coefficient of friction between two relatively moving surfaces varies with the type of lubrication therebetween.

A possible explanation of why the inventive cone clutch elements have improved bias ratio durability vis-a-vis previous, helically shaped cone clutches may involve differences in the type of lubrication experienced between the cone clutch element and interfacing clutch seat surfaces 62, 64 of casing 20. FIG. 10 is a Stribeck Curve, which shows generally how the coefficient of friction, μ, and type of lubrication vary with the lubricant viscosity and the relative speed and pressure between the interfacing, relatively moving surfaces. Three types of lubrication are indicated at the top of FIG. 10: Boundary Lubrication, where the surface of the lubricant layer is lower than the roughness protrusions of the interfacing surfaces, which are in contact; Hydrodynamic Lubrication, where a layer of lubricant is disposed between the interfacing surfaces and prevents their direct engagement; and Mixed Lubrication, where the surface of the lubricant layer is approximately equal to the that of the roughness protrusions of the interfacing surfaces. As can be seen, μ is at its lowest value near the transition point between Mixed Lubrication and Hydrodynamic Lubrication. The Stribeck Curve also shows that the three phases of lubrication progress from Boundary Lubrication to Mixed Lubrication to Hydrodynamic Lubrication as one of relative surface speed (Z) or lubricant viscosity (N) increase or contact pressure (P) decreases, the other two variables held constant. This lubrication phase sequence thus progresses with increasing values of X, where:

$$X = ZN/P \qquad \text{(Equation 2)}$$

Accordingly, FIG. 10 shows that μ reaches its highest values when X is either zero, in a pure Boundary Lubrication state (e.g., speed equals zero), or is very high, in a pure Hydrodynamic Lubrication state (e.g., P is very low).

Figure 11:
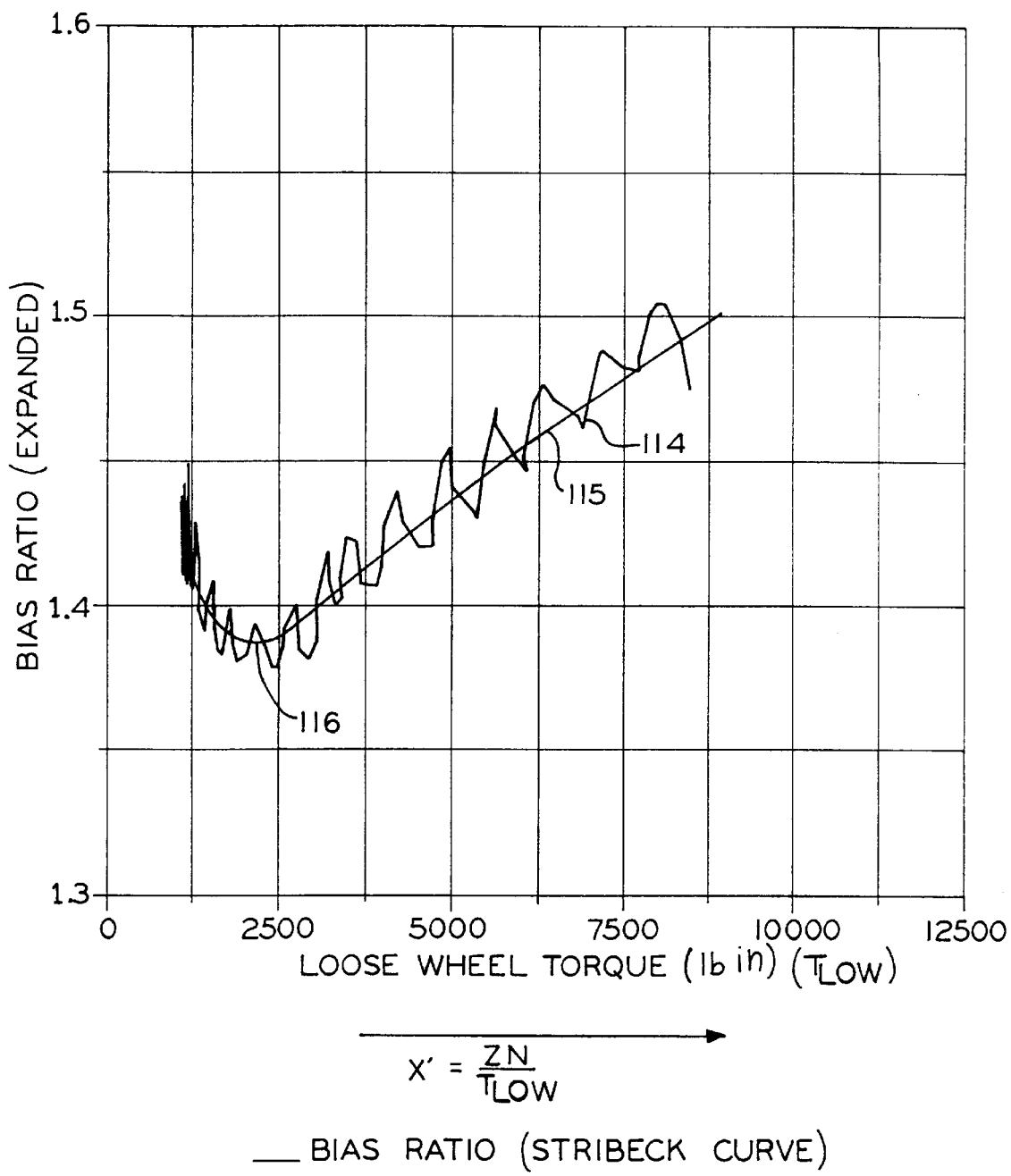
FIG. 11 is a graph illustrating the relationship between the bias ratio and the torque applied to the axle having the lower torque, for the differential of FIG. 1 without preload mechanism 54, after durability testing.

FIG. 11 is a graph similar to FIG. 4, showing post-durability test bias ratio values for given $T_{low}$ values for differential 10 of FIG. 1 with preload mechanism 54 removed. Thus, while FIG. 4 shows this relationship via line 96 for a complete differential, FIG. 11 shows this relationship via line 114 for the same differential with no preload on the cone clutch elements. Smoothed line 115 approximates data-generated line 114. As indicated in Equation 1, above, bias ratio is a linear function of torque. For a cone clutch element, torque (T) is a linear function of the coefficient of friction, $\mu$, as seen in the following formula:

$$T = D_m F_a \mu (2\sin(\theta/2)) \quad \text{(Equation 3a)}$$

where $D_m$ is the mean diameter of the clutch facing, $F_a$ is the axial engaging force and $\theta$ is the included angle between lines 71 and 72. Collecting terms, Equation 3a may be reexpressed as:

$$T = \mu[D_m F_a/(2\sin(\theta/2))] \quad \text{(Equation 3b)}$$

Where $D_m$, $F_a$ and $\theta$ are held constant, Equation 3b may be reexpressed as:

$$T = \mu C \quad \text{(Equation 3c)}$$

where C represents the constant. Therefore, it can be seen that for given clutch and axial load parameters, bias ratio, a linear function of torque according to Equation 1, is directly proportional to $\mu$. Between cone clutch elements 42 and 42a, $D_m$ and $\theta$ are equivalent, as is $F_a$ between the tested differential units.

In performing the measurements which yield the data represented in FIG. 11, relative surface speed (Z) is held constant and lubricant viscosity (N) is assumed constant. $T_{low}$ varies directly and linearly with pressure (P) and so Equation 2 can be re-expressed as:

$$X' = ZN/T_{low} \quad \text{(Equation 4)}$$

where X' is directly proportional to X.

Thus, it is postulated that line 115 in FIG. 11 represents a form of reverse Stribeck curve, where X' increases with lower values of $T_{low}$. Under this premise, for constant values of speed and viscosity, and increasing values of $T_{low}$, FIG. 11 shows the type of lubrication transitioning from Hydrodynamic Lubrication to Mixed Lubrication to Boundary Lubrication, with lowest bias ratio value 116, and thus the lowest $\mu$ value, occurring when $T_{low}$ is approximately 2000 pound inches.

Figure 12:
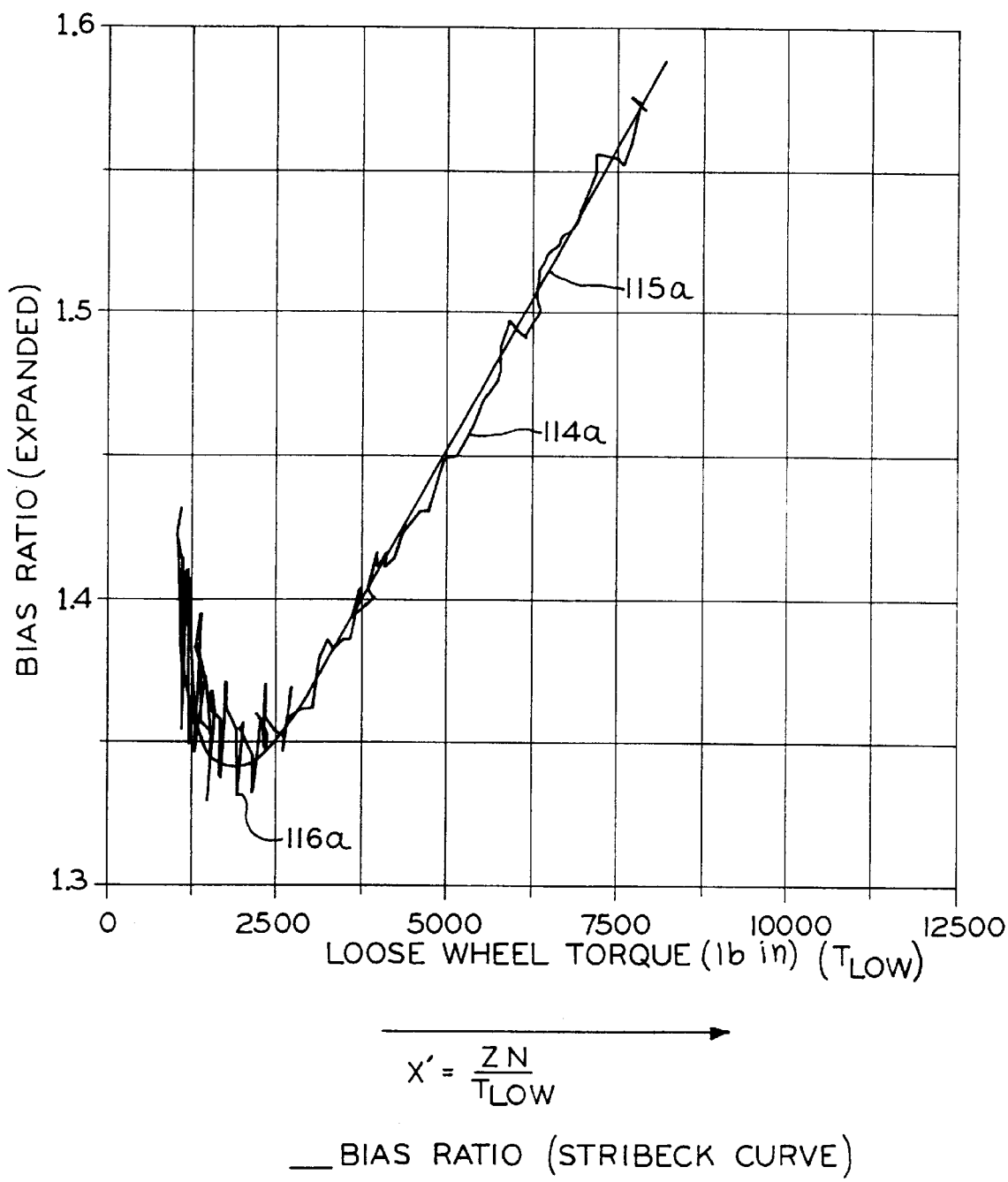
FIG. 12 is a graph illustrating the relationship between the bias ratio and the torque applied to the axle having the lower torque, for the differential of FIG. 5 without preload mechanism 54 and having two frusto-conical clutch elements as shown in FIGS. 8A–8C, after durability testing.

The graph shown as FIG. 12 is the counterpart of FIG. 11, illustrating post-durability test bias ratio values for given $T_{low}$ values for differential 10a of FIG. 5 with preload mechanism 54 removed. As in the case of comparing FIGS. 4 and 11 for the differential of FIG. 1, while FIG. 9 shows the relationship between $T_{low}$ and the bias ratio via line 96a for the complete differential of FIG. 5, FIG. 12 shows this relationship via line 114a for that differential with no preload on the cone clutch elements. Smoothed line 115a approximates data-generated line 114a. Direct comparison of line 115 of FIG. 11 and line 115a of FIG. 12 shows the slope of line 115a is much more aggressive in approaching and departing lowest bias ratio value 116a, which suggests that as $T_{low}$ changes, the inventive cone transitions faster through the Mixed Lubrication/Hydrodynamic Lubrication phase change, where $\mu$ is at a minimum.

Figure 14A:
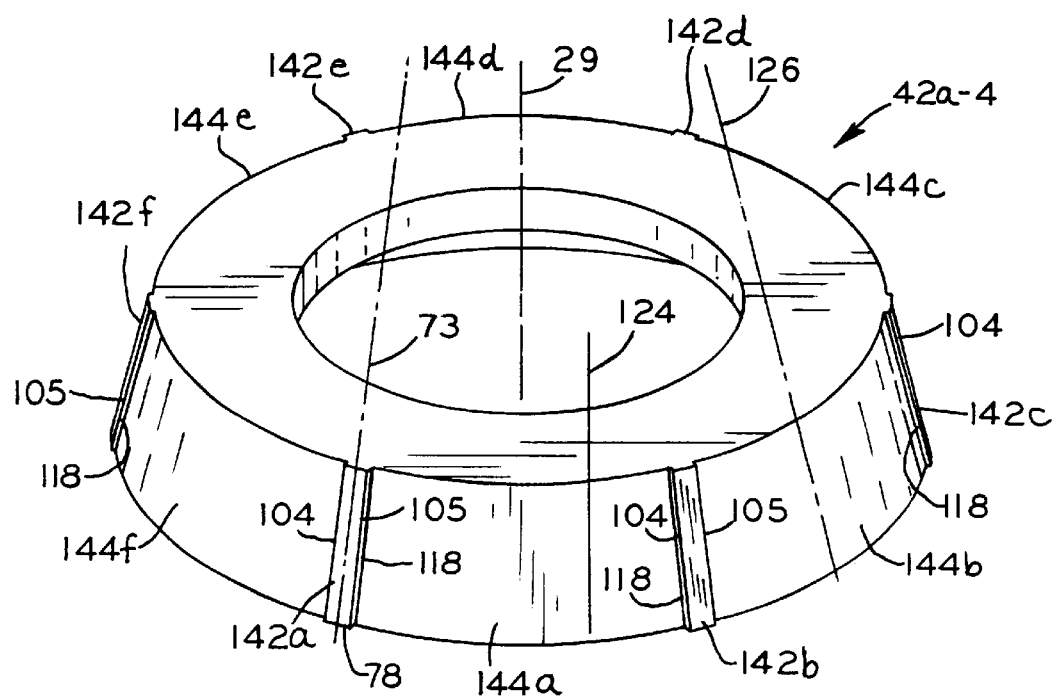
FIG. 14A is a perspective view of an embodiment of a further improved cone clutch element according to the present invention.
Figures 14B, 14C:
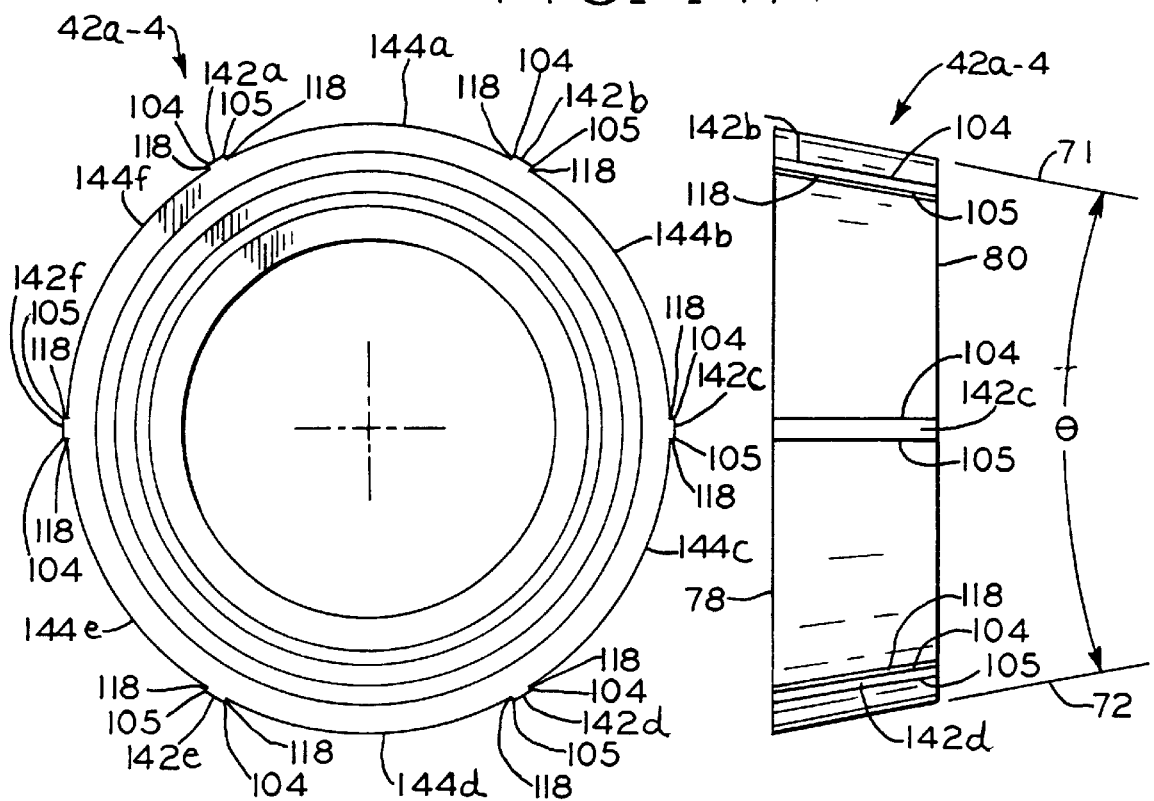
FIG. 14B is an end view of the cone clutch element of FIG. 14A.
FIG. 14C is a side view of the cone clutch element of FIG. 14A.

Referring to FIGS. 14A through 14C, a fourth embodiment of a cone clutch element according to the present invention is shown, designated with reference numeral 42a-4. This embodiment comprises six clutch engagement surfaces segments 142a, 143b, 142c, 142d, 142e, 142f of approximately equal area and generally disposed equally about the outer surface of the element 142a-4. Interposed between clutch engagement surface segments 142a–f are recessed areas 144a, 144b, 144c, 144d, 144e, 144f. In the fourth embodiment of the inventive cone clutch element 42a-4, the total engagement surface area is significantly less than that of prior art cone clutch element 42.

In each of the first three embodiments of the clutch cone element 42a-1, 42a-2, 42a-3, the total engagement surface area and total recess surface area each total about 5.2 square inches for each clutch element. Therefore, the percentage of total engagement surface area to total clutch surface area (total engagement surface area+total recess surface area) for each clutch element equals about 50% (5.2/(5.2+5.2)×100%). In the fourth embodiment the total engagement surface area totals about 0.8 square inches for each clutch element with the total clutch surface area remaining at 10.4 square inches. Thus, the percentage of total engagement surface area to total clutch surface area for each clutch element equals about 7.7% (0.8/10.4)×100%).

FIG. 15 shows limited slip differential test fixture 150. Test fixture 150 includes base 152, support arms 154, 160, housing 156, pinion gear 176 driven by motor 174, torque sensor 168, force mechanism 170, and ring gear 178 attached to differential 10. Shaft 162 is attached to clutch 180 and to support arm 154. The attachment of shaft 162 to support arm 154 is fixed and does not allow shaft 162 to rotate. Torque sensor 168 measures the torque applied to shaft 162 by differential 10. Force mechanism 170 exerts an axial force on clutch 180 driving clutch engagement surfaces 182 into frictional engagement with casing engagement surface 184. Force sensor 172 measures force (F) on clutch 180. Motor 174 rotates pinion gear 176 which rotates differential 10 via ring gear 178. Motor 174 rotates differential 10 from zero RPM to 70 RPM then back to zero RPM in 15 to 20 seconds to obtain the data for the graphs in FIGS. 16–19.

FIGS. 16–19 show graphs of the coefficient of friction between clutch engagement surface 182 and casing engagement surface 184 versus slip RPM for a pair of identical differentials only differing in the amount of surface area of the clutch engagement surfaces at lubricant temperatures of 72°–73° F. and 150° F. with constant loads ranging from 250 pounds to 1,500 pounds. Slip RPM is the difference between the rate of rotation of differential 10 and the rate of rotation of shaft 162. The differential used to generate the graphs in FIGS. 16a, 17a, 18a and 19a includes a clutch element having clutch engagement surfaces with total clutch engagement surface area of approximately 4 square inches. The differential used to generate the graphs in FIGS. 16b, 17b, 18b and 19b includes a clutch element having clutch engagement surfaces with total clutch engagement surface area of approximately 0.8 square inches. The total clutch surface area (total engagement surface area+total recess surface area) of each of the clutch elements is approximately 8 square inches.

Figure 16B:
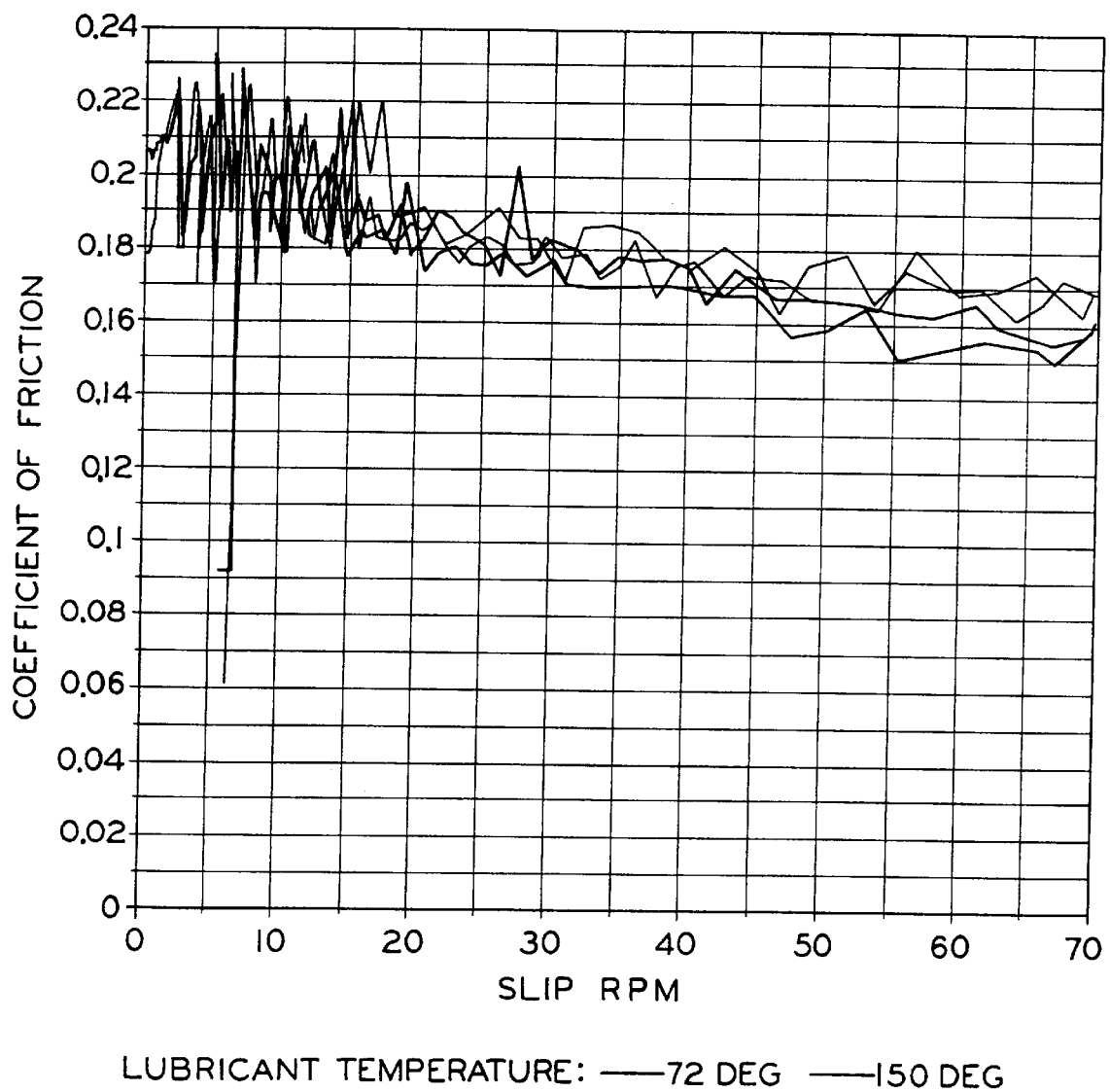
FIG. 16B is a graph illustrating the relationship between Slip RPM and Coefficient of Friction, at different lubricant temperatures, for a single, further improved cone clutch element according to the present invention as depicted in FIG. 14, as tested in a fixture according to FIG. 15, a constant, axially-directed load of 250 lb. applied to the cone clutch element.
Figure 17A:
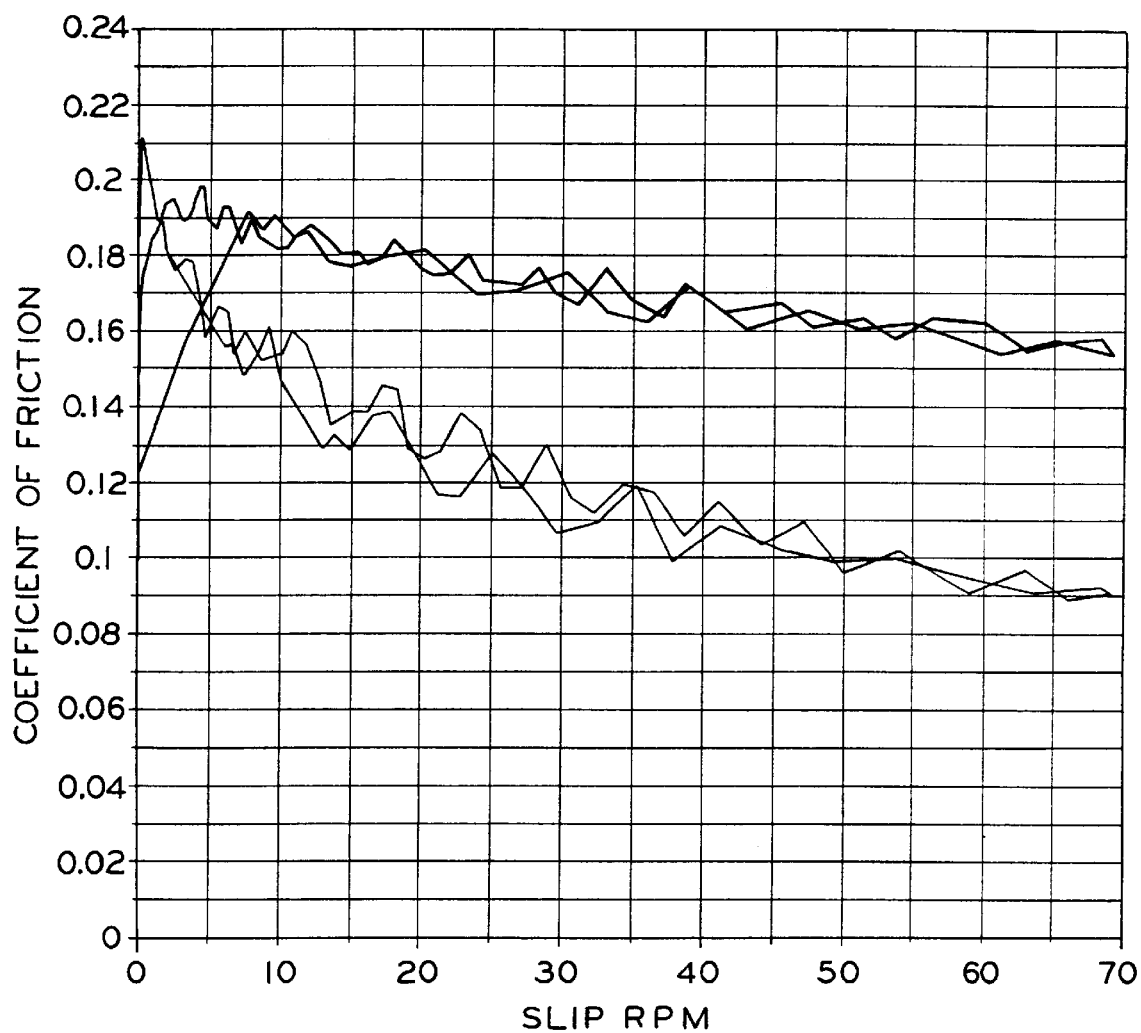
FIG. 17A is a graph illustrating the relationship between Slip RPM and Coefficient of Friction, at different lubricant temperatures, for a single cone clutch element as depicted in FIG. 8, as tested in a fixture according to FIG. 15, a constant, axially-directed load of 500 lb. applied to the cone clutch element.
Figure 17B:
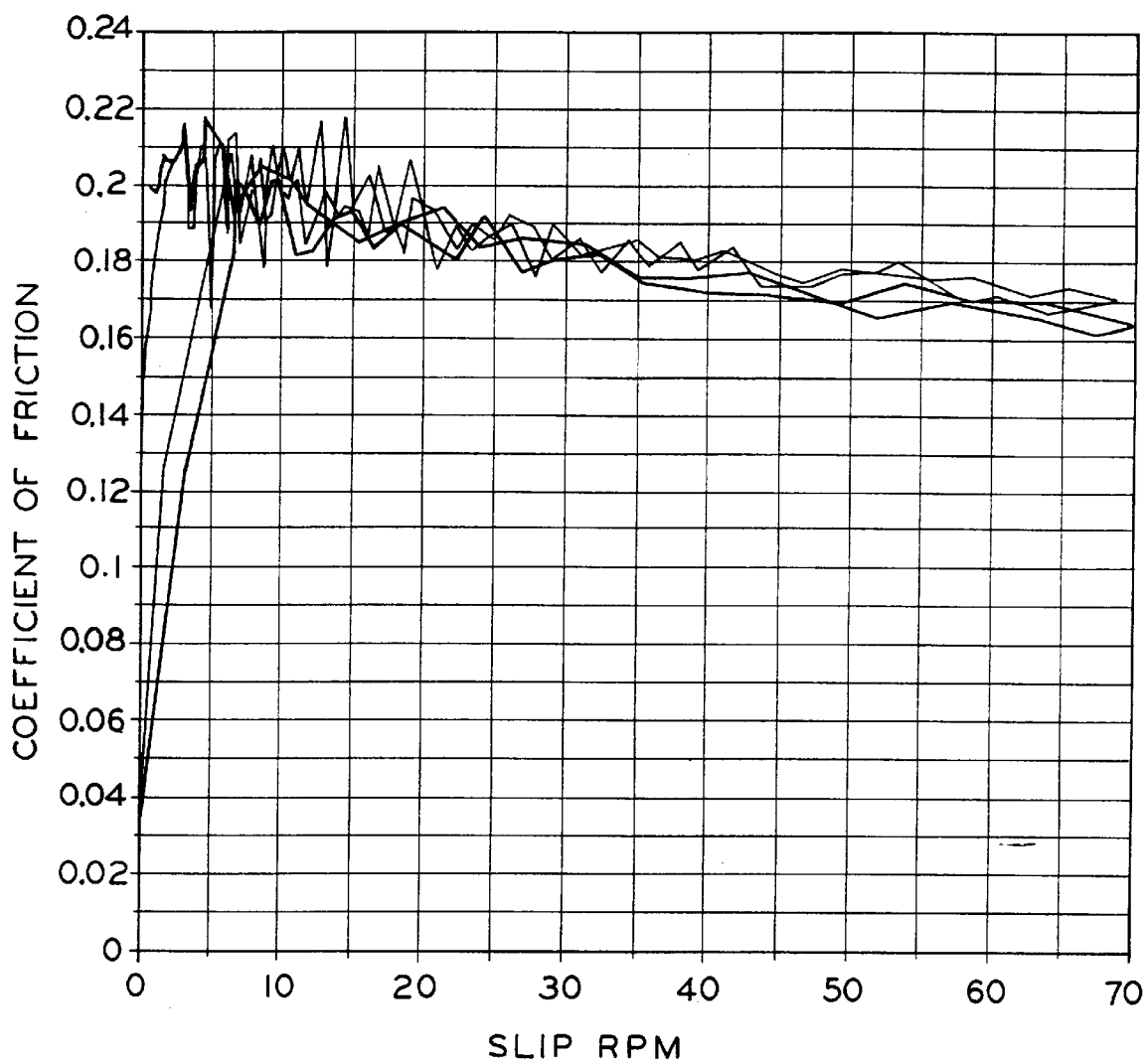
FIG. 17B is a graph illustrating the relationship between Slip RPM and Coefficient of Friction, at different lubricant temperatures, for a single, further improved cone clutch element according to the present invention as depicted in FIG. 14, as tested in a fixture according to FIG. 15, a constant, axially-directed load of 500 lb. applied to the cone clutch element.
Figure 18A:
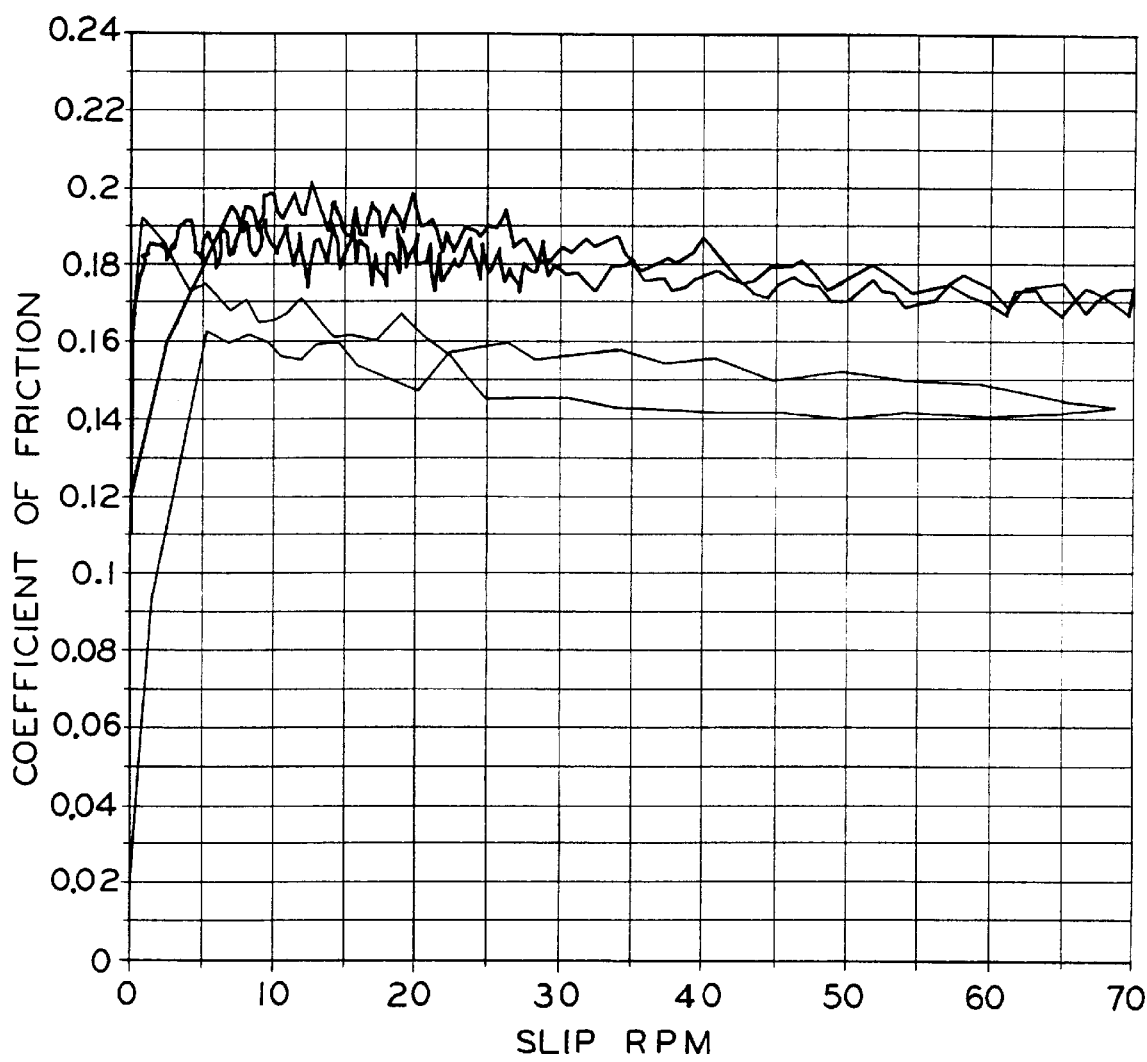
FIG. 18A is a graph illustrating the relationship between Slip RPM and Coefficient of Friction, at different lubricant temperatures, for a single cone clutch element as depicted in FIG. 8, as tested in a fixture according to FIG. 15, a constant, axially-directed load of 1000 lb. applied to the cone clutch element.
Figure 19B:
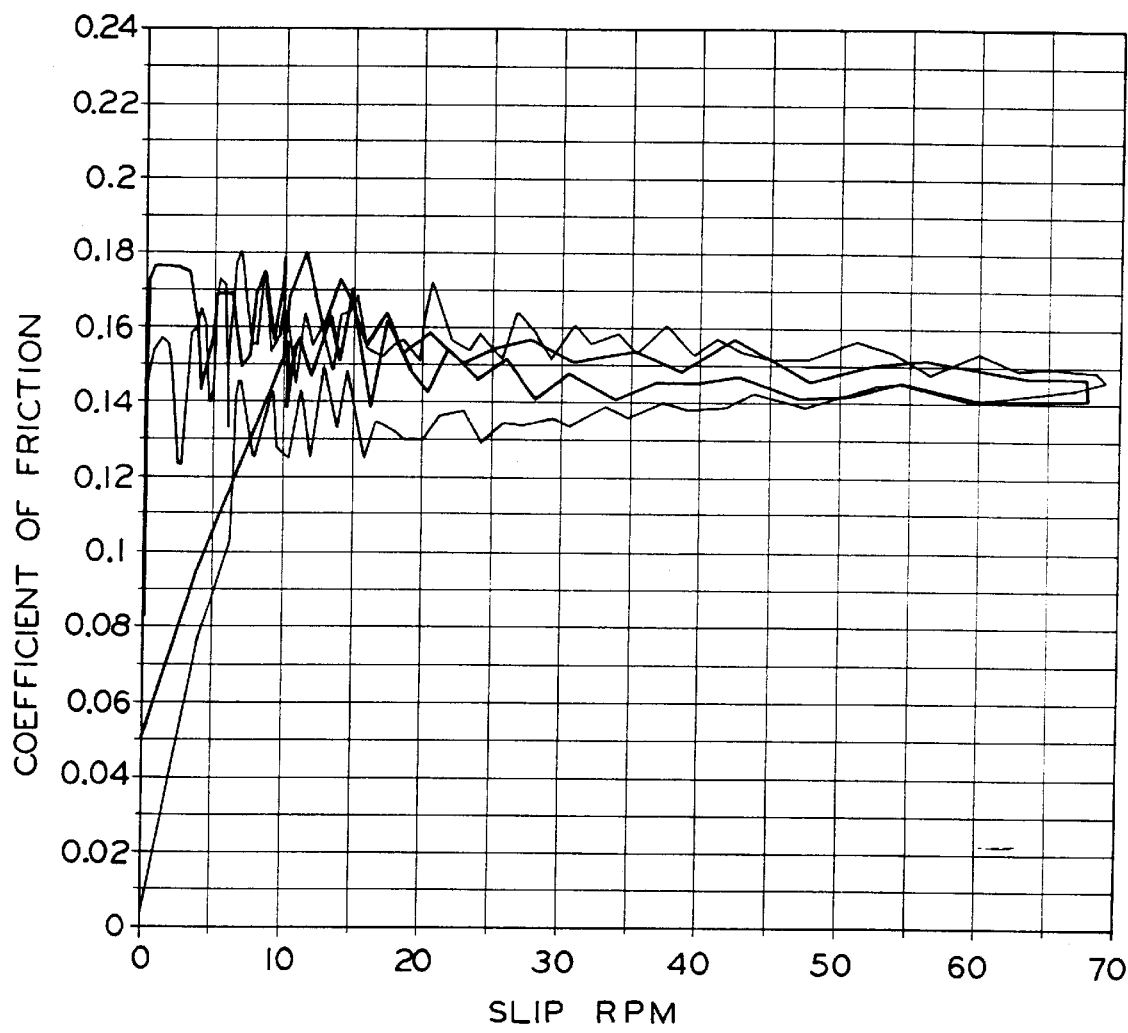
FIG. 19B is a graph illustrating the relationship between Slip RPM and Coefficient of Friction, at different lubricant temperatures, for a single, further improved cone clutch element according to the present invention as depicted in FIG. 14, as tested in a fixture according to FIG. 15, a constant, axially-directed load of 1500 lb. applied to the cone clutch element.

At constant loads of 250, 500 or 1,000 pounds, the variation in lubricant temperature has a substantial impact on the coefficient of friction for the differential with 4 square inches of clutch engagement surface area as seen in FIGS. 16a, 17a and 18a. At a constant load of 1,500 pounds, the lubricant temperature has little or no impact on the coefficient of friction for this differential as seen in FIG. 19a. However, the lubricant temperature has little or no impact on the coefficient of friction in the constant load range of 250 to 1,500 pounds with a differential having 0.8 square inches of clutch engagement surface area as seen in FIGS. 16b, 17b, 18b, and 19b.

The results of the bench testing shown in FIGS. 16 through 19 have been verified using an electrically controllable differential, such as that shown in FIG. 12 of U.S. patent application Ser. No. 09/030,602, now U.S. Pat. No. 5,989,147 in a Camaro test vehicle. The differential using the clutch core with the larger clutch engagement surface area required a warm-up period before performance was noticed in the test vehicle. However, the differential using the clutch core with the smaller clutch engagement surface area demonstrated immediate performance in the test vehicle.

A theory for the phenomenon seen in FIGS. 16–19 is that more lubricant is trapped between the clutch engagement surface and the casing at the lower lubricant temperatures due to the viscosity of the lubricant. The smaller clutch engagement surfaces distribute the varying loads over a smaller area of the casing forcing out the lubricant between the clutch engagement surface and the casing at the lower temperature, such that no more lubricant is between the surfaces than there would be at the higher temperature. The larger clutch engagement surfaces at the constant force of 1500 pounds were also able to force the lubricant out between the casing and the clutch engagement surface. Therefore, the differential utilizing the clutch with the smaller clutch engagement surface area is less sensitive to the temperature of the lubricant.

While this invention has been described as having exemplary designs, the present invention may be further modified within the spirit and scope of this disclosure. Therefore, this application is intended to cover any variations, uses, or adaptations of the invention using its general principals. Further, this application is intended to cover such departures from the present disclosure as come within known or customary practice in the art to which this invention pertains.

What is claimed is:

1. A limited slip differential comprising:

a pair of axles rotatable about a first axis;

a casing rotatable about said first axis;

at least one planet gear rotatable about an axis perpendicular to said first axis, said at least one planet gear revolving about said first axis;

a pair of side gears intermeshed with said at least one planet gear, each of said side gears rotatably fixed relative to one of said axles at all times during operation of the differential; and a clutch element disposed between the one of said axles to which said one side gear is rotatable fixed and said casing, said clutch element adapted to rotate with said at least one axle, said clutch element comprising a plurality of clutch engagement surfaces lying on a frusto-conical surface defined by a right circular cone having a vertex and a circular base, each of said clutch engagement surfaces bounded by at least one lateral edge, each of said clutch engagement surfaces completely contained within a surface of a right conic sector defined by two lines extending from said vertex to said circular base, said sector extending through an angle in the range of 0° to 180° about said base, clutch element operable to frictionally engage said one axle and said casing;

wherein the total surface area of said clutch engagement surfaces is in a range of 5% to 15% of the total surface area of said frusto-conical surface.

2. The differential of claim 1, including six said clutch engagement surfaces.

3. The differential of claim 1, wherein said clutch engagement surfaces are separated from each other by recessed areas.

4. The differential of claim 3, wherein each of said recessed areas is located between lateral edges of two of said plurality of clutch engagement surfaces.

5. The differential of claim 3, wherein said clutch element further comprises a transition surface which extends from each said at least one lateral edge bounding each of said clutch engagement surfaces to an adjacent one of said recessed areas.

6. The differential of claim 3, wherein said recessed areas each include substantially equal surface area.

7. The differential of claim 1, wherein said frusto-conical surface comprises a base and a tip, said lateral edges extend from said base to said tip.

8. The differential of claim 1, wherein said clutch engagement surfaces are evenly distributed about said clutch element.

9. The differential of claim 1, wherein two lines disposed radially opposite one another on said right circular cone define an included cone angle at said vertex in the range of 10° to 25°.

10. A rigid cone clutch element for a limited slip differential, comprising:

a plurality of clutch engagement surfaces lying on a frusto-conical surface defined by a right circular cone having a vertex and a circular base, each of said clutch engagement surfaces bounded by at least one lateral edge, each of said clutch engagement surfaces completely contained within a right conic surface sector defined by two lines extending from said vertex to said circular base, said sector extending less than 180° about the base, and wherein the total surface area of said clutch engagement surfaces is in a range of 5% to 15% of the total surface area of said frusto-conical surface.

11. The clutch element of claim 10, further comprising recessed areas interposed between said clutch engagement surfaces.

12. The clutch element of claim 11, wherein said clutch engagement surfaces and said recessed areas are substantially evenly distributed about said frusto-conical surface.

13. The clutch element of claim 11, further comprising a transition surface extending between each of said lateral edges and an adjacent said recessed surface.

14. The clutch element of claim 11, wherein said recessed areas are disposed approximately 0.040 inch below said clutch engagement surfaces.

15. The clutch element of claim 11, wherein said frusto-conical surface comprises a base and a tip, said clutch engagement surfaces and said recessed areas extending from said base to said tip.

16. The clutch element of claim 10, wherein lines disposed on each of said clutch engagement surfaces converge to form the vertex of a right circular cone.

17. The clutch element of claim 16, wherein two lines located radially opposite one another on said right circular cone define an included cone angle at said vertex in the range of 10° to 25°.

18. The clutch element of claim 10, including six said clutch engagement surfaces.

19. The clutch element of claim 10 wherein lines disposed along two adjacent said lateral edges are parallel.

* * * * *